US010024983B1

(12) United States Patent
Feng et al.

(10) Patent No.: US 10,024,983 B1
(45) Date of Patent: Jul. 17, 2018

(54) METAL-LOADED PLASTIC SCINTILLATORS FOR GAMMA-RAY SPECTROSCOPY

(71) Applicant: National Technology & Engineering Solutions of Sandia, LLC, Albuquerque, NM (US)

(72) Inventors: Patrick L. Feng, Livermore, CA (US); Joseph Gabriel Cordaro, Oakley, CA (US); Wondwosen Mengesha, San Ramon, CA (US); Nicolas Richard Myllenbeck, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/287,555

(22) Filed: Oct. 6, 2016

Related U.S. Application Data

(60) Provisional application No. 62/261,722, filed on Dec. 1, 2015.

(51) Int. Cl.
*H05B 33/00* (2006.01)
*G01T 1/203* (2006.01)
*G01T 1/204* (2006.01)

(52) U.S. Cl.
CPC .......... *G01T 1/2033* (2013.01); *G01T 1/2042* (2013.01)

(58) Field of Classification Search
CPC .......... G01T 1/2023; G01T 3/00; G01T 1/00; G01T 1/2033; G01T 1/362; C09K 11/06; C09K 11/55; C09K 11/7733

USPC ........................................................ 250/484.4
See application file for complete search history.

(56) References Cited

U.S. PATENT DOCUMENTS

| 3,041,287 A | 6/1962 | Hyman, Jr. | |
| 3,356,616 A | 3/1964 | Sandler et al. | |
| 5,317,158 A * | 5/1994 | McElhaney | G01T 1/2008 250/367 |
| 5,910,973 A * | 6/1999 | Grodzins | G01V 5/0016 378/53 |
| 8,698,086 B2 * | 4/2014 | Cherepy | C08F 230/04 250/361 R |

(Continued)

OTHER PUBLICATIONS

Author: Saint-Gobain Ceramics &Plastics, Title: It's what's inside that counts, Date: 2001, Publisher:Saint-Gobain Ceramics &Plastics.*

(Continued)

*Primary Examiner* — Taeho Jo
(74) *Attorney, Agent, or Firm* — Medley, Behrens & Lewis, LLC

(57) ABSTRACT

Exemplary embodiments of several new metal-loaded plastic scintillators are reported herein, comprising sterically and electronically isolated organotin additive complexes. Distance-dependent quenching relationships have been used as design criteria for the selection and synthesis of these organometallic additives, resulting in increased light yields and improved gamma-ray energy resolution values relative to previously reported PS/PVT examples. Fast scintillation decay properties have also been characterized in the prepared scintillators, rivaling the kinetics of stilbene-doped bibenzyl and BC-422Q-1% while providing higher light yields than these reference materials.

20 Claims, 14 Drawing Sheets

(56) References Cited

U.S. PATENT DOCUMENTS

| | | | | |
|---|---|---|---|---|
| 8,853,651 | B2* | 10/2014 | Doty | C09K 11/06 250/459.1 |
| 9,234,968 | B1* | 1/2016 | Cherepy | G01T 3/06 |
| 9,499,738 | B2* | 11/2016 | Hamel | C09K 11/06 |
| 2005/0208290 | A1* | 9/2005 | Patel | C09K 11/06 428/323 |
| 2008/0237470 | A1* | 10/2008 | Loureiro | G01T 1/16 250/361 R |
| 2008/0241040 | A1* | 10/2008 | Clothier | B82Y 30/00 423/263 |
| 2010/0019164 | A1* | 1/2010 | Stephan | G01T 3/00 250/390.04 |
| 2010/0104879 | A1* | 4/2010 | Okano | G02B 1/105 428/447 |
| 2011/0108738 | A1* | 5/2011 | Doty | C09K 11/06 250/459.1 |
| 2011/0315885 | A1* | 12/2011 | Cherepy | C08F 230/04 250/362 |
| 2012/0161013 | A1* | 6/2012 | Huston | G01T 1/2033 250/362 |
| 2012/0217386 | A1* | 8/2012 | Ricci | G01T 1/20 250/252.1 |
| 2013/0299702 | A1* | 11/2013 | Zaitseva | C09K 11/06 250/361 R |
| 2014/0027646 | A1* | 1/2014 | Zaitseva | G01T 1/203 250/361 R |
| 2014/0224993 | A1* | 8/2014 | Noh | G01T 3/06 250/362 |
| 2014/0332689 | A1* | 11/2014 | Van Loef | G01T 3/06 250/362 |
| 2015/0157887 | A1* | 6/2015 | Chilcott | A62D 3/30 424/70.16 |
| 2016/0017220 | A1* | 1/2016 | Hamel | C08F 212/08 250/362 |
| 2016/0102247 | A1* | 4/2016 | Cherepy | G01T 3/06 250/361 R |

OTHER PUBLICATIONS

Bertrand, et al., "Influence of Bisumuth Loading in Polystyrene-Based Plastic Scintillators for Low Energy Gamma Spectroscopy", In Journals of Materials Chemistry C, vol. 2, 2014, pp. 7304-7312.

Cherepy, et al., "Bismuth-And Lithium-Loaded Plastic Scintillators for Gamma and Neutron Detection", In Nuclear Instruments and Methods in Physics Research Section A: Accelerators, Spectrometers, Detectors and Associated Equipment, vol. 778, 2015, pp. 126-132.

Eriksson, et al., "Comparative Studies on Plastic Scintillators—Applications to Low Energy High Rate Photon Detection" In Nuclear Instruments and Methods, vol. 122, 1974, pp. 373-376.

Loef, et al., "Gamma-Ray Spectroscopy and Pulse Shape Discrimination With a Plastic Scintillator", in Nuclear Instruments and Methods in Physics Research Section A: Accelerators, Spectrometers, Detectors and Associated Equipment, vol. 788, 2015, pp. 71-72.

Rupert, et al., "Bismuth-Loaded Plastic Scintillators for Gamma-Ray Spectroscopy", In EPL (Europhysics Letter), vol. 97.2, 2012, p. 22002.

Lippincott et al., "Scintillation yield and time dependence from electronic and nuclear recoils in liquid neon", Phys. Rev. C86 (2012) 18pp.

* cited by examiner

METAL-LOADED PLASTIC SCINTILLATORS FOR GAMMA-RAY SPECTROSCOPY

CROSS-REFERENCE TO RELATED APPLICATIONS

This application claims priority to U.S. Provisional 62/261,722, filed on Dec. 1, 2015, which is hereby incorporated by reference in its entirety.

GOVERNMENT RIGHTS

This invention was made with Government support under Contract No. DE-AC04-94AL85000 between Sandia Corporation and the U.S. Department of Energy. The Government has certain rights in the invention.

BACKGROUND

Scintillators are materials that emit flashes or pulses of light when they interact with ionizing radiation. Scintillator crystals are widely used in radiation detectors for gamma-rays, X-rays, cosmic rays, and particles characterized by an energy level of greater than about 1 keV. It is possible to make radiation detectors, by coupling the crystal (or scintillator) with an element for detecting the light produced by the crystal when it interacts, or "scintillates," when exposed to a source of radiation. The photo-detector produces an electrical signal proportional to the intensity of the scintillation (or light pulses received from the scintillator material). The electrical signal is then processed in various ways to provide data on the radiation.

Gamma-ray spectroscopy is an essential capability for radioactive isotope identification and is typically accomplished using inorganic scintillators or semiconductors. Recent advances have resulted in exceptional spectroscopic performance from both of these classes, yielding 662 keV energy resolution values of less than 3% for scintillator and less than 1% for semiconductors. However, high detector costs and low production yields remain as two significant shortcomings that prohibit their replacement of NaI(Tl) scintillators in large-scale applications.

Organic-based plastic and liquid scintillators loaded with high-atomic number elements (e.g. heavy metals) have been proposed and investigated as an alternate paradigm for NaI(Tl) replacement, owing to their very low cost and ability to scale to very large sizes. For example, 1-10% lead-loaded plastic scintillators are commercially available, although prior work has shown that there are several significant limitations that preclude their usefulness for gamma-ray spectroscopy: (1) major reduction in the scintillation light yield as the heavy-atom additive concentration is increased, (2) limited solubility and light transmission properties of the heavy-atom additives, and (3) poor photopeak sensitivity and energy resolution values for energies above 100 keV. These attributes are the consequence of relativistic heavy-atom quenching effects and strong absorptive losses from the metal complex. The latter limitation has been addressed through the cooperative use of an iridium compound and organometallic bismuth complex.

In summary, plastic compounds provide a low cost solution for large-volume scintillators. However, there have been significant drawbacks realized when loading such plastics with the heavier scintillating elements. Not the least of which is that heavy elements are known to quench both fluorescence and scintillation. Furthermore, simultaneously providing both gamma-ray spectroscopy and fast neutron discrimination properties to a plastic scintillator has heretofore eluded those of skill in the art.

SUMMARY

The materials described herein are capable of providing gamma-ray spectroscopy with minimal light-yield quenching. An embodiment of the invention also permits simultaneous gamma-ray spectroscopy and fast neutron discrimination properties in a plastic scintillator. This capability allows for dual-mode gamma and neutron detection with a single material. It also has the potential to revolutionize the search for special nuclear materials via reduced false-alarm rates.

In an embodiment, a metal-loaded, liquid or plastic scintillator includes a matrix including a polymer or an aromatic liquid. In the matrix, an organometallic complex is dispersed that includes a heavy metal with an atomic weight between 69 g/mol and 226 g/mol, the heavy metal complexed with an organic ligand having a number average molecular weight of at least 15 g/mol. Optionally, the organic ligand is bonded to the polymer. A primary and secondary fluorophore are also dispersed in the matrix.

In an embodiment, a metal-loaded, liquid or plastic scintillator includes a matrix including a polymer or an aromatic liquid. In the matrix, an organometallic complex is dispersed that includes a heavy metal complexed with an organic ligand. Optionally, the organic ligand is bonded to the polymer. The heavy metal and the organic ligand are selected to provide the scintillator with the capability of resolving photoelectric absorption peaks in the scintillation pulse-height spectra for energies between 32 keV to 1274 keV, and to be capable of discriminating fast neutrons from gamma-rays according to the method of pulse-shape discrimination (PSD), while maintaining a scintillation light yield of at least 6,000 photons/MeVee. A primary and secondary fluorophore are also dispersed in the matrix.

In an embodiment, a method of making a metal-loaded liquid or plastic scintillator includes the steps of: dissolving an organometallic complex in an aromatic liquid or a monomer; dissolving a primary fluorophore in the aromatic liquid or monomer; dissolving a secondary fluorophore in the aromatic liquid or monomer; if the monomer is present, initiating polymerization of the monomer; and controlling heating and cooling rates to avoid cracking of the polymerized material. The organometallic complex includes a heavy metal with an atomic weight between 69 g/mol and 226 g/mol, and the heavy metal is complexed with an organic ligand having a number average molecular weight of at least 15 g/mol. Optionally, the organic ligand is bonded to a polymer formed from the monomer.

DETAILED DESCRIPTION

Figure 1:
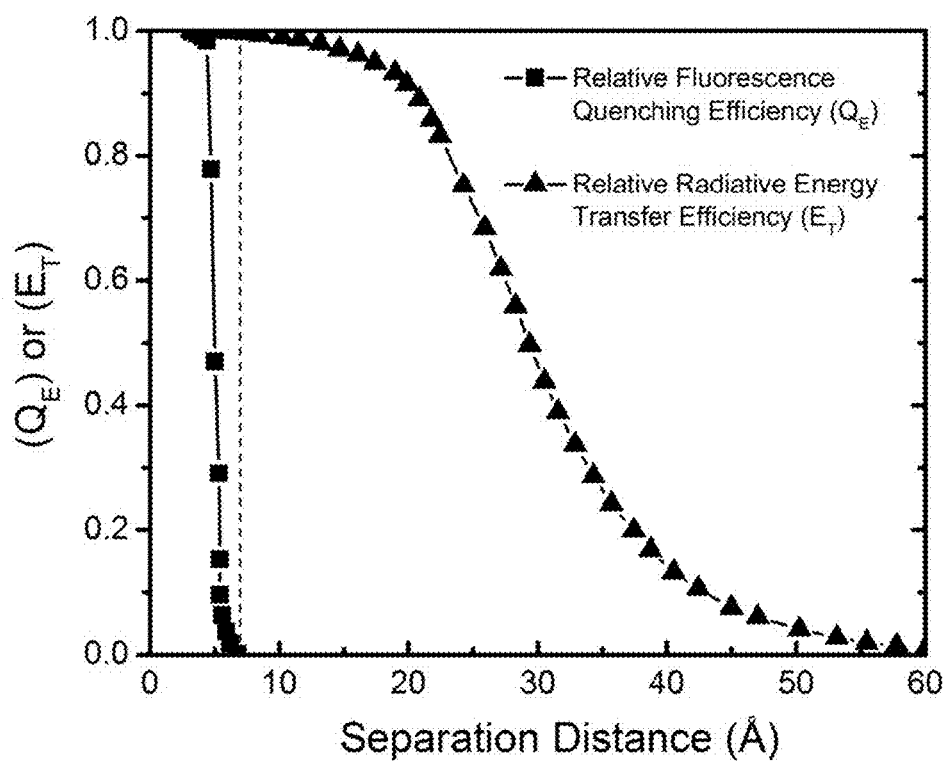
FIG. 1 is a plot showing the distance-dependence of heavy-atom quenching (squares) and radiative energy transfer (triangles) as a function of the separation between fluorescent donor and acceptor species. The dotted line represents the fluorophore-quencher distance.

Various technologies pertaining to scintillator materials, are now described. In the following description, for purposes of explanation, numerous specific details are set forth in order to provide a thorough understanding of one or more aspects. It may be evident, however, that such aspect(s) may be practiced without these specific details.

The strategy employed with the materials described herein involves the rational design of organometallic additives that take into account optical losses due to non-radiative absorption and intersystem crossing (ISC) via the heavy-atom effect. These considerations were identified as the most likely causes for the unsatisfactory performance of previously reported metal-loaded plastic scintillators. Minimization of losses due to optical self-absorption was achieved through de-coupling of the light-absorbing groups on the organometallic additive via bulky organic ligand spacers, e.g. aliphatic groups. This modification to the metal further reduces the effective spin-orbit coupling (and thus the extent of scintillation light-yield quenching). This proceeds according to a distance-dependent mechanism which has an exponential relationship between the heavy-atom quenching rate and the magnitude of the fluorescence light-yield quenching. The materials disclosed herein reduce the quenching rate by increasing the steric bulk via coordination number and identity of the coordinating ligands. This property is balanced against the distance-dependence of Forster Resonant Energy Transfer (FRET), which obeys a $r^{-6}$ distance-dependence and is required for the efficient conversion of ionizing radiation into optical photons (i.e. to function as a scintillator for spectroscopic gamma-ray detection).

ISC has been shown to reduce the emission light yield due to enhanced conversion into non-radiative states. This effect was first minimized through careful selection of the metal atom, as ISC is known to be more significant for heavier atoms. The spin-orbital (S-O) coupling matrix element describes the magnitude of ISC, and increases roughly as the square of the atomic number for isostructural Group 14 compounds. For example, the S-O coupling matrix elements for the Group 14 hydrides CH2, SiH2, GeH2, SnH2, and PbH2 assume values of 10, 40, 340, 750, 2300 cm-1, respectively.

Tin was identified as a suitable choice due to sufficient atomic density for increased gamma-ray sensitivity and S-O interactions that are modest relative to the magnitude of spin-spin interactions. Tin has been previously incorporated in liquid and organic scintillator matrices and is a component of the commercial plastic scintillator composition NE-140. However, the novel aspect of the present work takes into account a phenomenon known as distance-dependent quenching (DDQ), which has been studied and understood in the field of fluorescence spectroscopy. DDQ describes the extent of fluorescence quenching as a function of the distance-dependence of dipolar and electronic overlap interactions between fluorophore compounds and quencher atoms. This is summarized in FIG. 1, which compares the distance-dependence of radiative energy transfer from host matrix to fluorophore and non-radiative heavy atom quenching, respectively. From this plot, it is apparent that radiative energy transfer, also known as Førster Resonant Energy Transfer (FRET) is a longer-range process (FRET ∝ 1/r6) that remains operative at separation distances of several tens of angstroms. In the case of highly-loaded scintillators, the metal-containing additive may serve to spatially separate the donor and acceptor groups for FRET (exponential distance-dependence) that weakens significantly at quencher-fluorophore separation distances of greater than 5 Å.

Based on these considerations, certain heavy metal compounds have been targeted such as tin complexes, in which the steric environment enforces a fluorophore-quencher separation distance of more than about 5 Å but less than 20 Å (FIG. 1). FIG. 1 is a plot showing the distance-dependence of heavy-atom quenching (squares) and radiative energy transfer (triangles) as a function of the separation between fluorescent donor and acceptor species. The dotted line represents the fluorophore-quencher distance above which the relative efficiency of heavy atom quenching is expected to be zero.

This relationship between DDQ and scintillation quenching informs the selection of metals and ligands in the presently described scintillating materials. Other than tin, organometallic compounds based on Ge, In, Sn, or Sb are believed to be favorable for use in the present materials. In some embodiments, Pb or Bi are excluded, either completely or excluded as the only metal atom in the scintillator (that is, in such embodiments they may be present as secondary scintillating metals). These atoms possess very large spin-orbit coupling constants due to strong relativistic effects associated with the electronic structure of these heavy metals. Lower atomic number atoms such as Ge, In, Sn, and Sb possess significantly smaller spin-orbit coupling constants but also smaller gamma-ray cross sections. In embodiments described herein, the scintillating material balances these opposing considerations to achieve the highest radiation detection light yields and energy resolution, while maintaining sufficient gamma-ray sensitivity.

Embodiments of the materials disclosed herein can provide a class of low-cost polymer-based materials that are capable of being utilized to identify the energy spectrum of incident gamma ray radiation. This is typically achieved using inorganic materials that are too costly to scale to large sizes, such as, for example those larger than about three cubic inches. As disclosed herein, synthetically-modified organometallic additives can be selected based upon knowledge of distance-dependent quenching relationships in organic luminescent materials. As a result, it is possible to avoid reductions in the scintillation light yield that typically accompanies loading plastic scintillators with higher atomic-number elements such as Sn, Pb, or Bi.

Exemplary embodiments of the materials disclosed herein contrast with existing materials used for radiation detection in that such existing materials suffer from the following: (1) impractically high cost and availability of large-volume inorganic scintillators/semiconductors, (2) low atomic number (gamma-ray cross section) of organic-based materials, (3) significant light-yield quenching in previous examples of metal-loaded organic scintillators.

These limitations are addressed in the materials disclosed herein by incorporating sterically-modified organometallic complexes into plastic scintillator or liquid scintillator matrices. These compounds can take into account distance-dependent quenching (DDQ) relationships, for which the light-yield has been shown to depend upon the electronic interaction between the luminescent organic constituents and the metal compound additive. Stronger interactions between luminescent organic components and higher atomic number elements such as Sn or Pb have been shown to yield lower light yields, whereas weaker interactions have resulted in increased light yields. The strength of these interactions can be modulated by the steric separation between the interacting orbitals, as enforced by the ligand environment surrounding the metal center. It is possible to retain 100% of the light yield following the addition of 10% by weight of tin via a bulky organometallic complex. This compares to prior results which report a 50% reduction in light yield following the addition of 5% w/w of lead via a compound not structured according to the teachings disclosed herein. This distinction is important, since the gamma-ray energy resolution is known to depend upon the light-yield of the scintillator.

Exploring the DDQ relationships in the systems described herein led to the discovery that by utilizing certain heavy elements and expanding the spacing of the heavy metals from the fluorophores in the composition by use of bulky organic ligands, surprising results were achieved. For example, certain embodiments of the materials disclosed herein exhibit the following technical performance characteristics: about 10,000 photons/MeVee scintillation light yield and 10-11% energy resolution at 662 keV gamma ray energy. Another discovery that arose from the DDQ relationships described above is the ability to simultaneously perform gamma-ray spectroscopy and fast neutron discrimination according to the method of pulse-shape discrimination (PSD), in the same material.

In an embodiment, the components of the scintillating material include: (1) a plastic or liquid polymer matrix; (2) a primary and secondary fluorophore; and (3) an organometallic complex that further includes: (a) a heavy metal element and (b) a bulky organic group complexed to the heavy metal. In other embodiment, additional additives are provided.

In an embodiment, when a plastic polymer matrix is selected, it may be selected from, for example, polymers synthesized from vinyl-group containing monomers and/or terephthalate-group containing monomers. In an embodiment, co-polymers of vinyl-group and terephthalate-group containing monomers may be used, as well as copolymers of vinyl-group and/or terephthalate-group containing monomers with other monomers may also be used. Such polymers may be selected from the group of polystyrene, polyvinyltoluene, poly(9-vinylcarbazole), poly(methyl methacrylate), poly(ethylene terephthalate), or combinations thereof.

In an embodiment, the plastic polymer may, for example, have a weight average molecular (Mw) weight ranging from 40,000 to 1,000,000, such as 100,000 to 700,000, or 150,000 to 500,000. The plastic polymer may, for example, have a number-average molecular weight (Mn) of 20,000 to 900,000, 50,000 to 500,000, or 100,000 to 300,000. The plastic polymer may, for example, have a Mw/Mn of 1.01 to 5, such as 1.2 to 4, or 1.3 to 3. In an embodiment, the plastic polymer may have glass transition temperature (Tg) of 40 to 150° C. For example, in an embodiment for gamma-ray spectroscopy only, Tg values in the range of 70 to 160° C. are expected, and in and embodiment with compositions that provide gamma-ray spectroscopy and neutron/gamma pulse-shape discrimination, Tg values in the range of 40 to 80° C. are anticipated, owing to the higher concentration of primary fluorophore (up to 30% by weight of the total composition). The fluorophore acts as a plasticizer at these higher concentrations. In an embodiment with samples that are cross-linked, such as by using ≥3% (such as, up to 10%) by weight of the total composition of a vinyl- or methacrylate-based cross-linker, Tgs of up to 165° C. are possible. The plastic polymer should have high transparency, such as, for example, 85% to 100% light transmittance, such as 90% to 98%, or 92% to 97%. Test conditions from ASTM D1003-13 may be used to determine light transmittance.

In an embodiment, when an aromatic liquid is used as the matrix, the aromaticity of the liquid should be 50% to 100%, such as, for example, 70% to 98%, or 80% to 95% aromatic compounds by weight. Aromaticity assists in initiating the cascade of light production from the composition. Aromaticity of the total composition should be 40% by weight or more, such as, for example, 45% to 90%, or 65% to 85%.

Some examples of aromatic liquids include: benzene, toluene, 2,4-triphenylbenzene, alkylbenzene, in particular, linear alkylbenzene. The liquid matrix may comprise other liquids, such as co-solvents to enhance compatibility and solubility of other components.

The organometallic complex that is dispersed in the plastic or liquid matrix comprises a heavy metal that is complexed to a bulky ligand. Metal, as used herein, also includes the metalloids, also known as semi-metals. Heavy metals, as used herein, includes those with an atomic weight of at least 69 g/mol, such as, for example, 72 to 206 g/mol, or 114 to 210 g/mol, or 118 to 204 g/mol. Tin, antimony, germanium, and indium are particularly promising based on the spin-orbital considerations disclosed herein. Depending on the metal selected, one or more ligands may be complexed to the metal. For example, two to eight, or four to six ligands, may be complexed to the metal. In an embodiment, more than one metal atom may form a multinuclear metal cluster from which the ligands are complexed and emanate from.

The scintillator compositions described herein may contain between 1-80%, such as 5% to 55%, or 7.5% to 35% by weight of the organometallic complex. The heavy metal may be present in an amount of 1.5 to 40%, such as 5% to 35%, or 7.5% to 18% by weight of the total weight of the scintillator composition. The amount of metal may be limited by its solubility in the matrix material. Too much of the heavy metal may cause quenching of the scintillation; however, sensitivity of the scintillating material will be reduced with too little of the heavy metal.

The bulky ligand may be a branched or linear organic ligand. The term "organic" meaning, containing only C, H, and O atoms. The organometallic compound should possess sufficient steric bulk to suppress luminescence quenching. The molecular structure of the organometallic compound should be configured to provide separation distance between the metal atom and the organic matrix, so as to minimize or eliminate light-yield quenching according to the principle of distance-dependent quenching. This steric bulk can be expressed in terms of ligand length (as determined by the average kinetic diameter measured by kinetic diffusion studies such as DOSY-NMR or via molecular modeling calculations, and/or molecular weight (such as number-average molecular weight). In an embodiment, the ligand may have a length of about 5 to 20 Angstroms, such as, for example, 5.5 to 12 Angstroms, or 6 to 12 Angstroms. In some embodiments, the fluorescence quenching effect of the heavy metal drops to zero when the length of the ligand is about 7 Angstroms in the length. The term "about" in this context is used to account for inherent difficulties in exact measurements at such small lengths, and can vary, for example, in an amount of plus or minus 0.1. The maximum length of the ligands may be limited by difficulties in solubilizing large ligands in the matrix material. The total Mn of the coordinated ligands may, for example, range from at least 45 g/mol, such as 55 to 1000 g/mol, or 80 to 150 g/mol. In an embodiment, a single organic ligand may have a number average molecular weight of at least 15 g/mol, such as 29 to 500, or 55 to 150 g/mol. In one embodiment, the metal complex may be dispersed in the polymer matrix via non-covalent interactions. In another embodiment, the complexed ligands may be bonded to the polymer matrix via covalent bonds.

The following exemplary classes of compounds may be used in the polymer matrix.

a. Aliphatic organometallic compounds with the formula $(R_1)_x(R_2)_{4-x}M$, where M is a heavy metal, and $R_1$ and $R_2$ correspond to linear or branched alkyl substituents and x is an integer between 0 and 4. Representative examples of $R_1$ and $R_2$ include but are not limited to methyl, ethyl, propyl, butyl, isopropyl, or tert-butyl. In a particular embodiment, carboxylate groups may be used as $R_1$ and/or $R_2$. In an embodiment, the identity of the metal center M in the organometallic compound may comprise the following Group 13, 14, or Group 15 atoms: Ge, In, Sn, Sb Pb, or Bi.

b. Aromatic-containing organometallic compounds with the formula $(R_1)_x(R_2)_{4-x}M$, where M is a heavy metal, and $R_1$ and $R_2$ correspond to aromatic-based substituents and x is an integer between 0 and 4. Representative examples of $R_1$ and $R_2$ include but are not limited to phenyl, benzyl, phenylethyl, phenylpropyl, naphthyl, methylnaphthyl, styrl, or methylstyrl. In an embodiment, the identity of the metal center M in the organometallic compound may comprise the following Group 13, 14 or Group 15 atoms: Ge, In, Sn, Sb, Pb, or Bi.

c. Mixed aliphatic and aromatic-containing organometallic compounds with the formula $(R_1)_x(R_2)_{4-xM}$, where M is a heavy metal, $R_1$ and $R_2$ correspond to either of the aliphatic or aromatic substituents described in sections 2a and 2b above, and "x" is an integer between 0 and 4. In an embodiment, the identity of the metal center M in the organometallic compound comprises the following Group 13, 14, or Group 15 atoms: Ge, In, Sn, Sb, Pb, or Bi.

d. Polymerizable aliphatic or aromatic-containing organometallic compounds with the formula $(R_1)_x(R_2)_{4-x}M$, where M is a heavy metal, $R_1$ corresponds to the aliphatic or aromatic-containing substituents described in sections b and c above and $R_2$ corresponds to a polymerizable group such as styrl, methylstyrl, acrylate, methacrylate, vinyl methacrylate, or furfuryl methacrylate, and "x" is an integer between 0 and 4. In an embodiment, the identity of the metal center M in the organometallic compound comprises the following Group 13, 14, or Group 15 atoms: Ge, In, Sn, Sb, Pb, or Bi.

e. Sterically protected cluster compounds comprising polynuclear metal centers. The metal atoms may be bridged by a single atom such as an oxygen, or a linking group such as a polycarboxylate. Representative examples include polyoxometalate cluster compounds based on Bi, W, and Sn metal atoms that are surface-decorated with sterically bulky organic ligands, and 1-dimensional, 2-dimensional, or 3-dimensional coordination polymers of Pb and Sn polycarboxylates. Examples of such alkyl or aromatic-containing ligands include those that contain a coordinating carboxylate, alkoxide, or alcohol group. A subset of these compounds also includes those that may contain a polymerizable group such as styrl, methylstyrl, acrylate, methacrylate, vinyl methacrylate, or furfuryl methacrylate. Specific examples include the cluster compounds $[Bi_{38}O45(C_4H_5O_2)_{24}]$, $[(CH_3)_2AlBi(Si(CH_3)_3)_2]_3$, $[Bi_6O_4(OH)_4](NO_3)_6$, $[Bi(HOC_6H_4COOH)_3(C_{10}H_8N_2)]_2$, $[(BuSn)_{12}O_{14}(OH)_6(CH_2C(CH_3)CO_2)_2$, and the coordination polymer or copolymer compounds comprising monomers selected from the group consisting of: $[Sn(CH_3)_3(C_{11}H_7O_2)]$, $[Sn(CH_3)_3(C_{14}H_9O_2)]$, $[Sn(CH_3)_3(C_7H_5O_3)]$, $[Sn(C_4H_{10})_3(C_{11}H_7O_2)]$, $[Sn(C_4H_{10})_3(C_{14}H_9O_2)]$, and $[Sn(C_4H_{10})_3(C_7H_5O_3)]$.

In one embodiment, organometallic tin compounds present a particularly flexible platform from which to tune the steric and electronic properties of the additive to meet the DDQ-informed constraints described above. A representative subset of these compounds is shown in the structures 2-5 and 7-9B below. (Aromatic compounds are organized in the top row and aliphatic compounds in the bottom row. The molecular radii determined using molecular mechanics calculations are provided in brackets.)

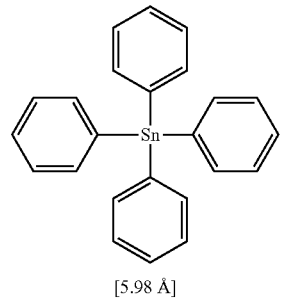

[5.98 Å]

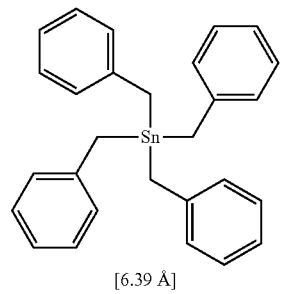

[6.39 Å]

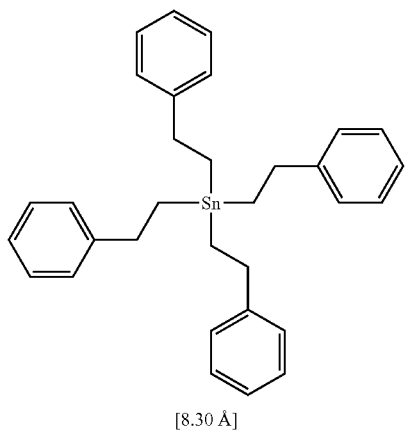

[8.30 Å]

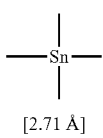

[9.22 Å]

[2.71 Å]

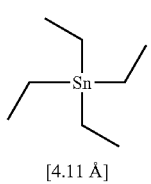

[4.11 Å]

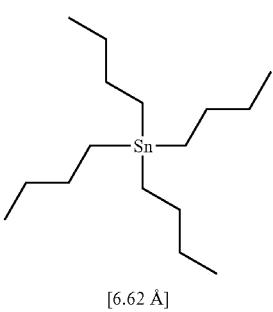

[6.62 Å]

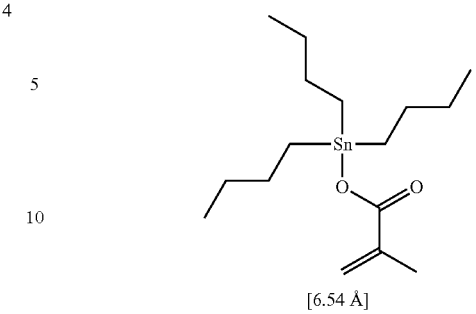

[6.54 Å]

In an embodiment, the coordinating groups may either be discrete small molecules that are dissolved in the polymer host matrix and/or comprise compounds that possess groups that may be co-polymerized with the polymer host matrix. Organometallic carboxylate compounds may be synthesized and isolated via a common procedure that involves reacting a metal-alkyl chloride, oxide, or hydroxide compound with the appropriate carboxylic acid in an organic solvent, followed by extraction, washing, and purification (recrystallization or chromatographic separation).

Target compounds were identified based upon several selection criteria that include solubility/miscibility in the desired matrix, molecular size, ease of synthesis, and electronic properties. Electronic properties refer to the optical absorption and emission transitions present in each compound, which may be evaluated using UV-Vis and fluorescence spectroscopy methods, respectively. A preferred property for a target compound is the absence of absorption transitions that do not lead to fluorescence. Solubility/miscibility was conferred by either employing aromatic moieties for simple dissolution in the matrix, or incorporation of polymerizable ligand groups for copolymerization with styrene. Molecular size was controlled by the steric properties of the selected ligand groups, whereas the electronic properties were modified by changing the distance between aromatic groups and the tin metal center. The example structures can be used with other heavy metal centers besides Sn with appropriate adjustments.

It is considered that although some of the heavy metals may have been previously used in plastic matrices before, they have not been modified with ligands in a manner that takes advantage of the distance-dependent quenching (DDQ) phenomenon. Accordingly, such materials, though similar, have not been able to achieve the performance aspects disclosed herein, as related to the criteria required for gamma-ray spectroscopy (Table I). Accordingly, some of the heavy metals may have been previously used in plastic matrices have not been able to achieve the performance aspects disclosed herein of combined gamma-ray spectroscopy and neutron/gamma pulse-shape discrimination.

In an embodiment, the scintillating compositions described herein include a primary fluorophore in the concentration range of 0.5-30% by weight of the total composition, such as, for example, 3 to 20%, or 5 to 15%. The identity of the primary fluorophore may be chosen as one of many known to those skilled in the art. Representative examples include: 2,5-diphenyloxazole (PPO), 2-(4-tert-butylphenyl)-5-(4-biphenylyl)-1,3,4-oxadiazole (butyl-PBD), and 9,10-diphenyl anthracene (DPA). Compositions containing organometallic additives and high concentrations of primary fluorophore (5-30% w/w) may be configured to exhibit both gamma-ray spectroscopy and neutron/gamma pulse-shape discrimination. The latter, i.e., the use of a high concentration of primary fluorophore to achieve neutron/gamma pulse-shape discrimination, is known to those skilled in the art.

In an embodiment, the scintillating compositions described herein also contain a secondary fluorophore in the concentration range of 0.01 to 0.2% by weight of the total composition, such as, for example, 0.05 to 0.15%, or 0.75 to 0.13%. The identity of the secondary fluorophore may be chosen as one of many known to those skilled in the art. Representative examples include: 1,4-Bis(5-phenyl-2-oxazolyl)benzene (POPOP), 1,4-Bis(2-methyl styrl)benzene, and 2-(1-Naphthyl)-5-phenyloxazole (NPO).

Crosslinker agents, such as cross-linking monomers, may be present in an amount of 0.5-15 weight percent, such as 1% to 10%, or 2% to 5%, based on the total weight of the scintillating composition. Examples of cross-linking agents include 1,4-divinylbenzene, 1,3-divinylbenzene, ethyleneglycol dimethacrylate, 1,6-hexanediol dimethacrylate, 1,4-butanediol dimethacrylate, 1,4-phenylene dimethacrylate, poly(propylene glycol) dimethacrylate, bisphenol A dimethacrylate, diethyleneglycol dimethacrylate, triethylene glycol dimethacrylate, tetraethyleneglycol dimethylacrylate, 2,2-Bis[4-(2-hydroxy-3-methacryloxypropoxy)phenyl]propane, and tricyclodecane dimethanol diacrylate. Free-radical initiators may also be used in conjunction with heating, UV, or radiolysis to control the rate and extent of bulk polymerization. Examples of organic peroxide free-radical initiators include lauroyl peroxide, benzoyl peroxide, tert-butyl hydroperoxide, and 2-butanone peroxide. Examples of azo-based free-radical initiators include azobisisobutyronitrile, 4,4'-azobis(4-cyanovaleric acid), and 2,2'-azobis(2-methylpropionitrile).

Plasticizers may be present in the plastic scintillators, which may change the thermal and mechanical properties of the material. In some embodiments, the plasticizer molecule may be the organometallic additive itself, as is the case for longer-chain organometallic compounds such as tetrabutyltin or tetrakis(phenylpropyl)tin. In other embodiments, plasticizers may comprise an organic molecule such as 2,5-diphenyloxazole (PPO), which is a recommended component for plastics that exhibit gamma-ray spectroscopy and neutron/gamma PSD capabilities. Plasticizers may be used in conjunction with the cross-linking agents described herein to modify the thermal and mechanical properties to meet application requirements. In general, plasticizers increase the free volume in the polymer and decrease the glass-transition temperature, whereas cross-linkers decrease the free volume in the polymer and increase the glass-transition temperature.

Residues of polymerization initiators may also be present in small quantities generally less than 1 wt. %, such as, 0.0001% to 0.1%, or 0.001% to 0.01%. In some embodiments, the residues may be fragments of functional initiators that may be dispersed or co-polymerized within the polymer matrix.

Copolymers may be employed to modify the optical, photophysical and mechanical properties of the plastic scintillator. In an embodiment, blends of polystyrene and poly(methyl methacrylate) may be employed to achieve improved hardness and optical quality. The improved optical quality may be achieved via improved solubility/miscibility of the organometallic additive and organic fluorophore within the copolymer matrix. In another embodiment, a copolymer of the organic monomer (i.e. styrene) and a polymerizable organometallic co-monomer (i.e. tributyltin acrylate) may be used to achieve high phase stability for the organometallic species. In this case, copolymerization enables the preparation of transparent samples at higher tin loading ratios compared with samples prepared using non-polymerizable tributyltin analogs. Copolymers may be employed in an amount of up to 30% by weight of the total composition, such as 1% to 20%, or 5% to 15%.

An example process for making a heavy metal-loaded scintillator comprises the method set forth herein.

In an inert atmosphere the organometallic compound may be dissolved in a matrix monomer (e.g., styrene or 4-vinyltoluene) or aromatic liquid in a concentration of 1-25% by weight of the metal atom, or other concentrations mentioned above for these components.

Then the primary fluorophore may be dissolved in a concentration of 0.5-30 wt. % or other weight percentages mentioned above. Concentrations of 0.5-3 wt. % are more suitable for gamma-spectroscopy only, whereas concentrations greater 3%, such as 4 to 10%, or 12 to 25% are more suitable for dual-mode gamma-spectroscopy and neutron/gamma PSD.

Next the secondary fluorophore is added and dissolved in a concentration of 0.01-0.05 wt. % or other weight percentage ranges mentioned above for secondary fluorophore.

Optionally, a co-monomer and/or cross-linker may be added and dissolved at a concentration of 0.5-15 wt. % or other weight percentage range mentioned above for these components.

Optionally, a radical initiator may be added and dissolved in an amount effective to initiate polymerization. The radical initiator may comprise, for example, AIBN or an organic peroxide.

Optionally, pre-treatment methods may be employed including silanization of the glass reaction vessel and/or sonication to remove dissolved gases from the mixture.

In an embodiment, the reaction mixture is transferred to a heavy-walled glass reaction vessel prior to polymerization. At that point, the reaction vessel is sealed and heated to a defined polymerization temperature in an oven or using a heat transfer fluid (oil, water, etc.). The heating and cooling ramp rate is controlled for cross-linked samples to avoid potential cracking due to the buildup of hydrostatic stress.

In an embodiment, alternate procedures are used when using organometallic complexes that possess high vapor pressures, e.g., complexes having a boiling point of less than 100° C., such as 20° C. to 85° C., or 55° C. to 80° C. at the elevated temperatures typically employed in typical thermal polymerization reactions (i.e. 100-130° C.). An example of such an additive is tetramethyltin, which has a boiling point of 74-76° C. Attempted polymerization at temperatures above 70° C. lead to reduced metal loading ratios and inhomogeneous incorporation within the polymer matrix, owing to minimal solubility and a preference for existing in the vapor phase. Attempted linear polymerization at temperatures below 70° C. led to high residual monomer ratios even after long heating times. In such embodiments, the issue is addressed by implementing an additive(s) that increases the polymerization activity and thus allows for lower temperatures. Such additives include cross-linking additives such as ethyleneglycol dimethacrylate (EGDMA) and/or 1,4-divinylbenzene in concentrations of 0.5%-15% by weight of the total composition, such as 1 to 10%, or 2 to 5% by weight. This allows for polymerization conditions that yield optically defect-free, colorless, and transparent samples that possess the highest light yield. The reaction conditions (i.e., temperature, heating rate, and reaction time) impact the observed properties, as demonstrated in Examples X and Y in the Examples section below.

Thermal stresses may be introduced in cross-linked materials and this should be taken into account when performing larger-scale polymerizations to avoid potential failure via fracture. This is done by adjusting the heating/cooling rate, polymerization temperature, polymerization vessel material, and heat-transfer medium. The optimum conditions for Examples 1 and 2 above comprise using a silanized sealed glass polymerization vessel immersed in a pre-heated water or oil bath at the temperatures provided.

In an embodiment, alternate procedures are utilized when co-polymerizing the organometallic additive with the host matrix. An example is the compound tributyltin methacrylate (acrylate), which may be co-polymerized with polystyrene. The polymerization process in such case should be modified to achieve controlled polymerization from the gelation stage through the final polymerization stage. This is to achieve the lowest residual (i.e. unreacted) monomer ratio. Residual monomer has been shown to have deleterious effects upon the physical/mechanical properties, long-term stability, and the scintillation light yield. Exemplary conditions for tributyltin methacrylate (acrylate) copolymerization with polystyrene involves pre-polymerization at 70° C. for 4 hours, followed by final polymerization at 110-115° C. for 3 days.

In an embodiment, the scintillator material is mechanically rigid at room temperature, for example, with a Shore D hardness (ASTM D2240 00) of 15 or greater, such as 20 to 100, or 40 to 60. The scintillator material, may be dimensioned to fit various applications. Example geometries are cylindrical, cubical, or prismatic, and each of the dimensions (height, length, width, diameter) may independently range, for example, from 5 inches to 0.01 inches, 3 inches to 0.25 inches, and 2 inches to 0.5 inches.

Applying the DDQ factor and other teachings disclosed herein allows for the materials disclosed herein to have the chemical formula and structure that produces the ability to resolve photoelectric absorption peaks in the scintillation pulse-height spectra for energies between 32 keV-1274 keV while maintaining a scintillation light yield of at least 60%, such as 65% to 95%, or 70% to 90% that of a commercial reference plastic scintillator that does not contain an organometallic additive. Examples of such reference plastic scintillator materials include the commercial products EJ-200, EJ-204, BC-400, BC-404 that have been well-characterized in the literature to possess absolute scintillation light yields of between 10,000 and 10,400 photons/MeVee when evaluated with a bialkali photomultiplier tube and integrated using a 250 ns-1 μs shaping time. Thus, the scintillator materials disclosed herein are capable of resolving photoelectric absorption peaks in the scintillation pulse-height spectra for energies between 32 keV-1274 keV while maintaining a scintillation light yield of at least 6,000 photons/MeVee, such as 6,500 to 9,500, or 7,000 to 9,000 photons/MeVee.

In embodiments, application of the principals disclosed herein allows for the synthesis of scintillation materials that are capable of achieving photoelectric peak energy resolution values of between 8-14% for 662 keV gamma rays, such as, for example, 8-13%, or 11-12%. The energy resolution is defined as the percentage value of the photoelectric peak position divided by the full width at half maximum of the peak when fit by a single Gaussian function. The measurement is performed using a bialkali photomultiplier tube with a shaping time of 250 ns-1 μs.

In embodiments, application of the principals disclosed herein allows for the synthesis of scintillation materials that are capable of performing simultaneous gamma-ray spectroscopy (as described in the two preceding paragraphs) and fast neutron/gamma pulse-shape discrimination (PSD) in a single material. PSD is imparted to the baseline composition by increasing the primary fluorophore concentration to >3% by weight. Preferred embodiments involve 10-30 wt. % of 2,5-diphenyloxazole primary fluorophore dissolved in the polymer matrix, which is additional to the organometallic compound mixed or co-polymerized within the same matrix.

The scintillating materials disclosed herein may be used for isotope identification in applications that require high detection efficiency (large-volume) and significantly lower cost than achievable using inorganic scintillators or semi-conductors. A specific example of a preferred application comprises radiation portal monitors (RPMs) used at ports-of-entry to a country. Currently, RPMs are based on large panels (i.e. 14"×68"×3") of conventional plastic scintillators. These portals are incapable of gamma-ray spectroscopy and therefore subject to relatively high false alarm rates from benign gamma-ray backgrounds. Replacement of conventional plastic scintillators with the scintillating materials disclosed herein would increase the detection and identification efficiency of potential threat materials via increased gamma-ray cross sections of the metal-loaded plastics and the novel ability to perform gamma-ray spectroscopy. The implementation of dual-mode spectroscopic and pulse-shape discriminating plastics described herein would further improve the detection efficiency since fission threat sources emit both characteristic gamma rays and fast neutrons. The neutron discrimination capabilities of such a material would enable further enhanced rejection of benign background radiation.

EXAMPLES

It has been shown that there is reduced spectroscopic performance for bismuth-containing scintillators based upon the standard polymers polystyrene and polyvinyltoluene, respectively (Table 1). A lead-loaded polyvinyltoluene scintillator that exhibits both neutron/gamma pulse-shape discrimination and a 16% photopeak at 662 keV has recently been described, although the observed energy resolution is inferior to the materials described in the present application. Furthermore, in contrast to certain prior solutions, embodiments of the materials described herein are readily scalable and are based upon low-cost polymer and fluorophore components.

Examples C and E and Comparative Examples 1-7

Materials

All reagents were obtained from Sigma-Aldrich, Broadpharm, or TCI America in their highest available purity. 2-(4-tert-butylphenyl)-5-(4-biphenylyl)-1,3,4-oxadiazole (butyl-PBD') was used as received. Styrene monomer was purified by passing through a column of basic alumina. Organometallic compounds were prepared via nucleophilic addition reactions between the respective organomagnesium halide Grignard reagents and tin(IV) chloride, or through condensation reactions between methacrylic acid (MA) and the appropriate organotin oxide or hydroxide precursor. Grignard reaction products were purified on a column of silica gel, whereas organotin methacrylate products were readily purified by recrystallization at reduced temperatures from hexanes. The purity of all synthesized organotin compounds was verified by $^1$H and $^{119}$Sn NMR. Scintillators were prepared via free-radical polymerization of styrene and styrene/Bu3 Sn(MA) co-polymers at temperatures of 90-115° C. with added 2,2'-azobisisobutyronitrile (AIBN). Analogous vinyltoluene compositions were also prepared, although styrene was ultimately selected due to its comparable scintillation properties, lower cost and increased mechanical hardness. The polymerization conditions were optimized to yield the highest degree of optical transparency. Typical sample sizes were 5 or 10 mL measured using a volumetric flask. Samples were polymerized in silanized glass vials and polished using a diamond-tipped lathe.

Table I shows a comparison of the gamma-ray photopeak energy resolution values obtained for several metal-loaded plastic scintillators (Comparative Examples) and Examples according to the present disclosure (Examples C, E, and I). Lower energy resolution values and higher gamma-ray light yields are preferred.

[4] N. J. Cherepy, R. D. Sanner, P. R. Beck, E. L. Swanberg, T. M. Tillotson, S. A. Payne, et al., "Bismuth- and lithium-loaded plastic scintillators for gamma and neutron detection," Nucl. Instr. Meth. A, pp. 126-132, 2015.
[5] L. A. Eriksson, C. M. Tsai, Z. H. Cho, and C. R. Hurlbut, "Comparative studies on plastic scintillators-applications to low energy high rate photon detection," Nucl. Instr. Meth., vol. 122, pp. 373-376, 1974.
[6] EJ-200 is a general purpose plastic scintillator available from Eljen Technology.

Comparative Example 2 shown in Table V comes the closest of all the comparative examples to matching the performance of the present work. However, this Comparative Example requires the use of an expensive brittle material, and a chemically less stable polymer matrix (poly(9-

TABLE I

| Scintillator Reference | Matrix | Metal Additive | 59.5 keV Energy Resolution | 122 keV Energy Resolution | 511keV Energy Resolution | 662 keV Energy Resolution | Gamma Light Yield (photons/MeV)[‡] |
|---|---|---|---|---|---|---|---|
| Example C [see Table V] | PS | Sn (4%) | 28.7 | 26.5 | 11.7 | 10.9 | 7900 |
| Example E [see Table V] | PS | Sn (6%) | 29.9 | 27.3 | 12.1 | 11.4 | 6700 |
| Example J [see Table V] | PS | Sn (13%) | 30.3 | 19.6 | 13.3 | 10.6 | 8500 |
| Comparative Example 1 (van Loef et al.) [1] | PVT | Pb (*) | 35 | * | * | 16 | 9000 |
| Comparative Example 2 (Rupert et al.) [2] | PVK | Ir (0.6%), Bi (19%) | 26 | * | * | 6.8[†] | 7200 (vs. EJ-208) |
| Comparative Example 3 (Bertrand et al.) [3] | PS | Bi (6.3%) | 73.0 | 72.6 | * | No photopeak observed | 3000 |
| Comparative Example 4 (Cherepy et al.) [4] | PVT | Bi (6.0%) | * | * | * | 15[†] | 3500 |
| Comparative Example 5 NE-140 [5] | PS | Sn (5%) | 66.8 | 54.7 | 22.5 | No photopeak observed | * |
| Comparative Example 6 EJ-256 [3] | PVT | Pb (2%) | * | 43.3 | * | * | 7200 |
| Comparative Example 7 EJ-256 [3] | PVT | Pb (5%) | * | 72.1 | * | * | 5100 |
| EJ-200 [6] Commercial Scintillator | PVT | None | 32 | No photopeak observed | No photopeak observed | No photopeak observed | 10000 |

*Indicates data not reported.
[†]Energy resolution determined by (non-standard) deconvolution fitting of the overlapping escape and photopeaks. A convolved energy resolution value of ~13% was determined using the (standard) method employed for the other entries in this table.
[‡]Relative to EJ-200 (or EJ-208, where indicated).
PS refers to polystyrene, PVT to polyvinyltoluene and PVK to poly(9-vinylcarbazole).

[1] E. v. Loef, G. Markosyan, U. Shirwadkar, M. McClish, and K. Shah, "Gamma-ray spectroscopy and pulse shape discrimination with a plastic scintillator," Nucl. Instr. Meth. A, vol. 78, pp. 71-72, 2015.
[2] B. L. Rupert, N. J. Cherepy, B. W. Sturm, R. D. Sanner, and S. A. Payne, "Bismuth-loaded plastic scintillators for gamma-ray spectroscopy," Europhys. Lett., vol. 97, p. 22002, 2012.
[3] G. H. V. Bertrand, F. Sguerra, C. Dehe-Pittance, F. Carrel, R. Coulon, S. Normand, et al., "Influence of bismuth loading in polystyrene-based plastic scintillators for low energy gamma spectroscopy," J. Mater. Chem. C, vol. 2, pp. 7304-7312, 2014.

vinylcarbazole)). Industry generally defines this polymer as unviable for bulk optical materials such as plastic scintillators.

Measurement Conditions

Steady-state photoluminescence (PL) spectra were obtained using a Horiba Jobin-Yvon Fluorolog FL3-21 fluorometer. UV-Vis absorption measurements were collected using a Shimadzu UV-3600 Plus spectrophotometer for dilute organotin solutions in hexane. Diffusion Ordered Nuclear Magnetic Resonance Spectroscopy (DOSY-NMR) measurements were performed on a Bruker Advance III 500 under standard pulse field gradient conditions. A bipolar stimulated echo was used for all experiments at a temperature of 298 K. Pulse-height spectra were obtained using a Hamamatsu R2059 PMT operated at −1900V. Samples were wrapped in Teflon tape and coupled to the PMT face using polydimethylsiloxane optical grease prior to measurement. Pulses were digitized using a 12-bit LeCroy HRO66Zi oscilloscope. The waveforms were integrated in real-time over an interval of 100 ns and histogrammed to yield the spectra shown in FIGS. 4 and 5. Energy resolution values were derived from Gaussian fits to the obtained photopeaks and defined as the FWHM divided by the peak position. Scintillation timing distributions were obtained by the method of time-correlated single-photon counting using a Hamamatsu H6610 PMT as the well-coupled start pulse and a Hamamatsu R7207-01 PMT as the single-photon stop pulse. The time delays between pulses were histogrammed to provide the data shown in FIG. 7.

Table II provides a comparison of the relative photopeak fraction (%) of total detected events for four different 1" metal-loaded scintillators. Examples A and B were 1" diameter×0.5" thick. The other entries in this table were 1" diameter×1.14" thick.

TABLE II

| Scintillator [Reference] | Metal Additive | 33 keV | 59.5 keV | 122 keV | 511 keV | 662 keV |
|---|---|---|---|---|---|---|
| Example C [see Table V] | Sn (4%) via Bu$_3$Sn(MA) | 100 | 97 | 55 | 1.3 | 0.4 |
| Example E [see Table V] | Sn (6%) via Bu3Sn(MA) | 100 | 100 | 63 | 3.2 | 1.0 |
| Example J [see Table V] | Sn (13%) via Me$_4$Sn | 100 | 100 | 85 | 5.1 | 1.7 |
| Bertrand et al. [1] | Bi (6.3%) | | 94 | 72 | * | † |
| Comp. Ex. 6 (EJ-256) | Pb (2%) | | | * | 16 | * | * |

*Indicates data not reported.
†Indicates photopeak not observed

[1] G. H. V. Bertrand, F. Sgueera, C. Dehe-Pittance, F. Carrel, R. Coulon, S. Normand, et al., "Influence of bismuth loading in polystyrene-based plastic scintillators for low energy gamma spectroscopy," *J. Mater. Chem. C*, vol. 2, pp. 7304-7312, 2014.

Examples 1-9

UV-Vis Spectroscopy:

The energy resolution of a scintillator is dependent upon several factors, which includes the light output and light collection efficiency. These properties are intrinsically associated with the absorption and emission properties of the material, i.e. self-absorption is detrimental to the energy resolution. The identity of Examples 1-9 is shown in Table III.

TABLE III

| Example 1 | Bi(C$_6$H$_5$)$_3$ |
|---|---|
| Example 2 | Sn(C$_6$H$_5$)$_4$ |
| Example 3 | Sn(C$_6$H$_5$CH$_2$)$_4$ |
| Example 4 | Sn[C$_6$H$_5$(CH$_2$)$_2$]$_4$ |
| Example 5 | Sn[C$_6$H$_5$(CH$_2$)$_3$]$_4$ |
| Example 6 | Toluene |
| Example 7 | (a) Sn(CH$_3$)$_4$/(b) Sn(CH$_3$)$_3$(C$_4$H$_5$O$_2$) |
| Example 8 | (a) Sn(CH$_3$CH$_2$)$_4$/(b) Sn(CH$_3$CH$_2$)$_3$(C$_4$H$_5$O$_2$) |
| Example 9 | (a) Sn[CH$_3$(CH$_2$)$_3$]$_4$/(b) Sn[CH$_3$(CH$_2$)$_3$]$_3$(C$_4$H$_5$O$_2$) |

To quantify the extent of absorptive losses, UV-Vis absorption spectra were collected for several organometallic tin compounds and compared to reference triphenylbismuth (Example 3) and tetraphenyltin (Example 4) complexes used in earlier work. These results are summarized in FIG. 2.

Figure 2:
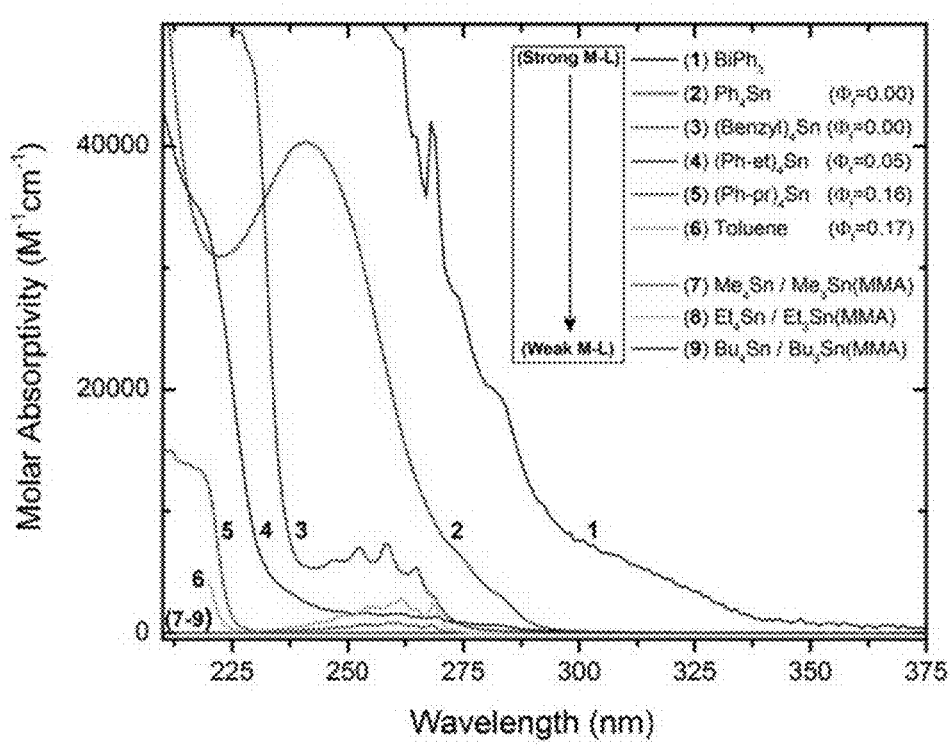
FIG. 2 is a plot showing UV-Vis absorption spectra for various organometallic compounds in hexane.

FIG. 2 shows UV-Vis absorption spectra for various organometallic compounds (Examples 1-9) in hexane. The spectra for Examples 1-5 indicate reduced optical absorption (losses) as the distance between ligand phenyl group and metal center is increased. Aliphatic compound Examples 7-9 exhibit very little light absorption in this wavelength range. The data in FIG. 2 indicate that there are absorption transitions introduced through interaction of the aromatic groups and the metal atoms, hereafter referred to as metal-ligand (M-L) interactions. These M-L absorptions are directly associated with light-yield losses following photoexcitation or scintillation, as confirmed by emission quantum yields near zero. Of the tested compounds, the strongest M-L absorptions were observed in Examples 1 (Ph$_3$Bi) and 2 (Ph$_4$Sn), in which the phenyl group is directly bound to the metal. Successively weaker M-L absorptions were observed as non-aromatic spacer groups were inserted between the organic absorber and metal atom in Examples 3-5. In fact, absorption properties similar to that of pure toluene were observed for a spacer length of three methylene groups in compound 5, which indicates virtually no M-L interaction. A similar result was obtained for the non-aromatic metal Examples 7-9, which are non-absorptive in the expanded wavelength range of 210-375 nm. These findings suggest that the best candidates for scintillator additives are the optically 'inert' compounds, i.e., Examples 5, 7, 8, 9a, and 9b.

Solubility/Miscibility

Segregation of immiscible phases in loaded plastic scintillators commonly results in opacity, which is problematic for light collection in scintillators of practical size. To address this potential issue, aromatic moieties were employed on the organic ligands to increase the solubility/miscibility in the polystyrene host matrix. Organotin compound Examples 2-5 were found to all exhibit high fractional solubility/miscibility in polystyrene, although one limitation to this approach is a reduced molar concentration of tin at a given mass fraction of compound. For example, transparent scintillators could be produced for organotin complex loading ratios of up to 40% by weight of the compound, which corresponds to 11.1% Sn for 3 yet only 4.3% Sn for 5. An additional consequence of high loading ratios is that the organotin additive may serve as a plasticizer, leading to reduced scintillator hardness at higher loading ratios. This was found to be a significant issue for compounds 3 and 5 near their solubility/miscibility limits, which led to soft samples that were difficult to machine and polish.

In response to these considerations, non-aromatic organotin compounds were evaluated to increase the fractional mass of tin atoms. Scintillators with up to 9% Sn by weight of the total compound was achievable for Me$_4$Sn (Example 7), whereas Et$_4$Sn (Example 8) led to maximum loadings of up to 8% Sn by weight of the total compound. Both compounds were also found to plasticize polystyrene, which led to rubbery/elastic physical properties at higher loading ratios. The larger compound Bu$_4$Sn (9a) was found to be insoluble in polystyrene, which prevented more detailed studies on the systematic effects of aliphatic ligand length.

A significant advance that addressed the phase stability problem was the synthesis and incorporation of tributyltin methacrylate, Bu$_3$Sn(MA) (9b), which retains the favorable steric properties of Bu$_4$Sn but incorporates a methacrylate ligand group that can be co-polymerized with the polystyrene matrix. As such, transparent scintillator samples were produced that were loaded with up to 32% tin by weight of the total composition via Bu₃Sn(MA). However, mechanically rigid samples could only be obtained for tin concentrations of 15% by total weight of the composition or less when delivered using this compound.

Diffusion Constants and Molecular Radii

Table IV shows diffusion constants and molecular radii of Examples 2-9 (See Table III) obtained via DOSY-NMR measurements. Experimental molecular radii were derived from the measured diffusion constants and the calculated molecular radii were derived from the sum of bond lengths for idealized molecular geometries.

TABLE IV

| Examples | Measured Diffusion Const. (m²/s) | Experimental Molecular Radius (Å) | Calculated Molecular Radius (Å) |
|---|---|---|---|
| (Aromatic) | | | |
| 2 | 9.19 · 10⁻¹⁰ | 6.23 | 5.98 |
| 3 | 8.56 · 10⁻¹⁰ | 6.69 | 6.39 |
| 4 | 7.92 · 10⁻¹⁰ | 7.24 | 8.30 |
| 5 | 7.06 · 10⁻¹⁰ | 8.10 | 9.22 |
| (Aliphatic) | | | |
| 7 | 2.11 · 10⁻⁹ | 2.72 | 2.71 |
| 8 | 1.84 · 10⁻⁹ | 3.11 | 4.11 |
| 9a | 1.21 · 10⁻⁹ | 4.74 | 6.62 |

Steric Properties and Distance-Dependent Quenching

Diffusion measurements were collected for the synthesized organometallic compounds to quantify the effective molecular sizes within the framework of Distance-Dependent Quenching (DDQ). This was achieved using Diffusion Ordered Spectroscopy (DOSY), which measures the diffusion rate of the compound when dissolved in an inert solvent, $$D = \frac{k_B T}{6\pi \eta r_H} \quad (1)$$

where D is the self-diffusion coefficient, η is the solvent viscosity, and rH is the hydrodynamic ratio. The molecular size may then be extracted from the diffusion rate by calculating the inverse ratio against a known reference material. The results from this analysis were summarized in Table IV, which is organized according to aromatic and aliphatic categories. As expected, the molecular radius of even the smallest aromatic compound (Example 2) is greater than 5 Å, which is within the target range for minimal heavy-atom quenching. The largest compound (Example 5) possesses a molecular radius of 8.1 Å, which leads to complete suppression of heavy-atom quenching according to FIG. 1. Photoluminescence and scintillation measurements for a 4% tin-loading via Example 5 confirm this expectation, as reflected in a 96% fluorescence quantum yield and scintillation light yield that was 94% that of an EJ-200 reference sample. Similar behavior was not observed for Examples 2-4, which exhibit low scintillation and quantum yields. In those examples, light-yield quenching is primarily associated with optical losses from M-L absorptions.

Figure 3:
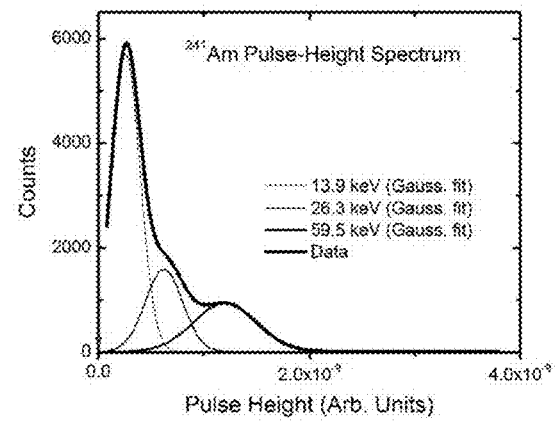
FIG. 3 shows $^{241}$Am (top), $^{137}$Cs (middle), and $^{22}$Na (bottom) scintillation pulse-height spectra for Example E. The y-axis of the bottom figure is plotted on a logarithmic scale to highlight the photopeak at 1274 keV.
Figure 3:
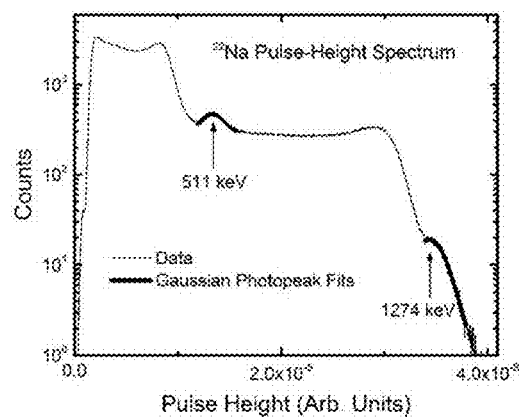
Figure 3:
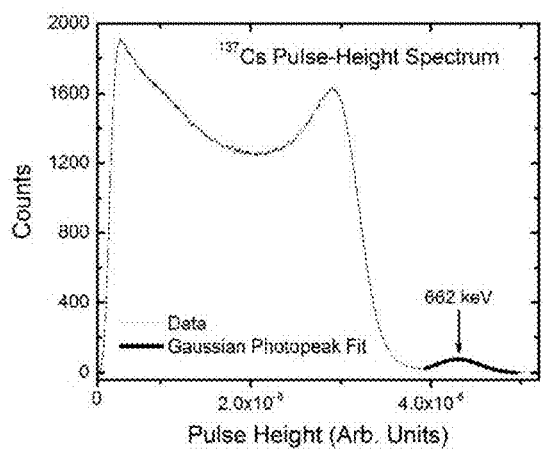

FIG. 3 shows ²⁴¹Am (top), ¹³⁷Cs (middle), and ²²Na (bottom) scintillation pulse-height spectra for Example E. The colored lines represent Gaussian fits to the respective photopeaks. The y-axis of the bottom figure is plotted on a logarithmic scale to highlight the photopeak at 1274 keV.

Figure 4:
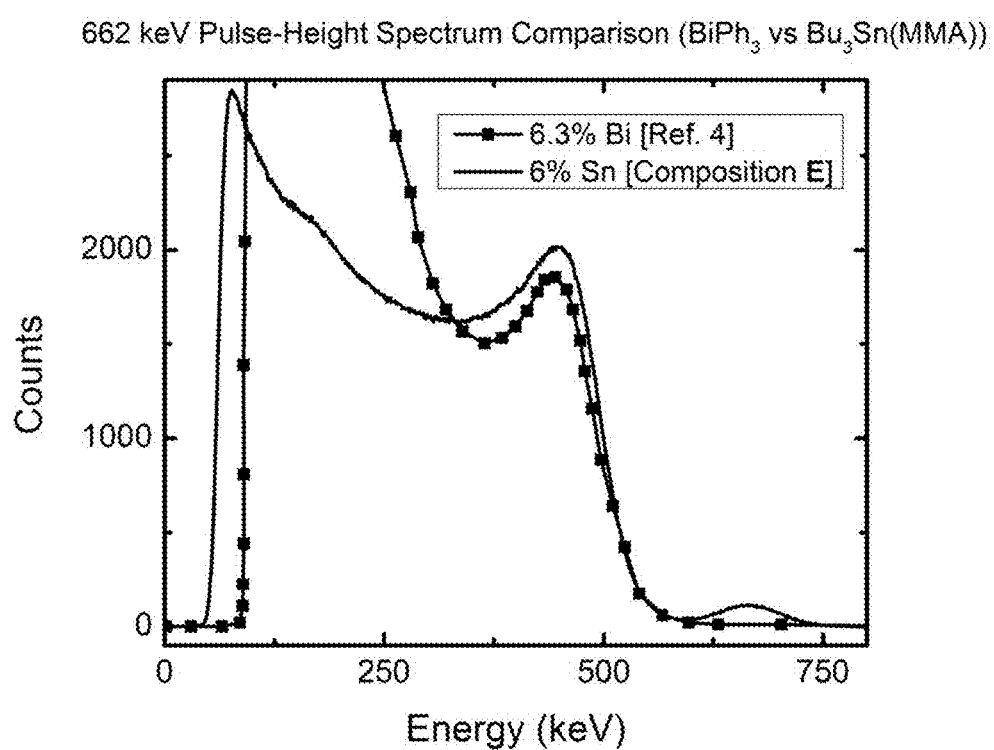
FIG. 4 shows a $^{137}$Cs pulse-height spectrum comparing the results obtained for example E and a 6.3% Bismuth-loaded polystyrene scintillator.

FIG. 4 is a ¹³⁷Cs pulse-height spectrum comparing the results obtained for Example E and a 6.3% Bismuth-loaded polystyrene scintillator. The energies have been calibrated with reference to the 662 keV photopeak in the black spectrum.

Diffusion measurements on the aliphatic Examples 7-9 indicated less favorable steric properties, for which the largest aliphatic compound 9a possessed a measured molecular radius of 4.74 Å. This experimentally-derived value is less than the calculated radius of 6.54 Å, which has significant implications for the extent of heavy-atom quenching. According to FIG. 1, 4.74 Å is on the steep part of the quenching curve, whereas 6.54 Å is on the tapering portion of the curve. The former value is expected to lead to relative heavy-atom quenching interactions of approximately 50%.

Scintillation Light Yields

Table V provides a comparison of the relative scintillation light yield obtained from the ¹³⁷Cs photopeak position for several polystyrene-based scintillator compositions. Samples 1A-1H each contain 1% by weight of the total compositions of butyl-PBD as the primary fluorophore.

In particular, Table V summarizes the relative scintillation light yields obtained for Bu₃Sn(MA)-based samples 1B-1H, which correspond to tin concentrations of 3-15% by weight of the total composition. The observed reductions in light yield for these scintillators is consistent with the heavy-atom effect due to the non-absorptive nature of Example 9b between 210-375 nm. These findings are in contrast to the results obtained for the aromatic compounds of Examples 2-4, which possess reduced heavy-atom quenching but significant losses due to absorption. The above results emphasize the importance of considering both the steric and electronic properties when selecting the organometallic additive.

Scintillation measurements on the 6% tin-loaded Example 1E (containing the organometallic compound Example 9b) indicate that light-yield quenching is still present but reduced in magnitude relative to analogous samples produced using less sterically bulky tin compounds. The ¹³⁷Cs scintillation pulse-height spectrum for Example 1E reveals a light yield that is 67% that of the tin-free reference scintillator EJ-200.

TABLE V

| Example # | Tin Complex | Mass % Tin | Rel. Light Yield |
|---|---|---|---|
| EJ-200 (Ref.) | N/A | N/A | 1.0 |
| A | Sn[C₆H₅(CH₂)₃]₄ | 4 | 0.94 |
| B | Sn[CH₃(CH₂)₃]₃(C₄H₅O₂) | 3 | 0.83 |
| C | Sn[CH₃(CH₂)₃]₃(C₄H₅O₂) | 4 | 0.79 |
| D | Sn[CH₃(CH₂)₃]₃(C₄H₅O₂) | 5 | 0.68 |
| E | Sn[CH₃(CH₂)₃]₃(C₄H₅O₂) | 6 | 0.66 |
| F | Sn[CH₃(CH₂)₃]₃(C₄H₅O₂) | 9 | 0.56 |
| G | Sn[CH₃(CH₂)₃]₃(C₄H₅O₂) | 12 | 0.46 |
| H | Sn[CH₃(CH₂)₃]₃(C₄H₅O₂) | 15 | 0.37 |
| I | Sn(CH₃)₄ | 5 | 0.98 |
| J | Sn(CH₃)₄ | 13 | 0.79 |

An additional consideration that may contribute to the observed light-yield reduction in Examples B-H is the presence of non-aromatic and carbonyl oxygen ligands on Bu₃Sn(MA), which may serve to dilute the aromatic content of the scintillator or quench the luminescence through non-radiative n→π* transitions. Control samples (not shown) prepared with a comparable amount of MMA in place of Bu3 Sn(MA) revealed that this effect is small compared to the heavy-atom quenching effect of tin.

Other Scintillation Properties

Scintillation measurements were performed on 1" diameter×0.5" thick cylinders of scintillator Examples A-H, whose compositions are outlined in Table V. Example A was prepared using the bulky aromatic tin compound (Ph-pr)$_4$Sn (5), which we found to exhibit no detectable fluorescence quenching due to self-absorption or the heavy atom effect. Scintillation results were generally consistent with this behavior, as reflected by a 662 keV energy resolution of 11.0%. Unfortunately, all samples of Example A were soft, likely due to a plasticizing effect of (Ph-pr)$_4$Sn (5). Changes in the light yield and energy resolution were also observed for Example A after an interval of two weeks, which we attribute to transient diffusion of the plasticizer within the polymer matrix.

In response to these limitations, Examples B-H were prepared, based on the co-polymerizable organotin compound Bu$_3$Sn(MA). Although tin loadings of 32% by weight of the total composition could be obtained, concentrations of up to 15% were focused on due to degraded mechanical properties and reduced light yields at higher tin concentrations (see Table V).

A suitable compromise between tin loading ratio and scintillation light yield was found at a tin concentration of 6% by weight of the total composition (example E). This conclusion was made based on Monte Carlo N-Particle MCNP simulations (see below), which predict a 6% tin-loaded plastic would yield approximately 15% the 662 keV photopeak sensitivity as an equivalent volume of NaI(Tl).

Corresponding scintillation pulse-height spectra for Example E are provided in FIG. 3, which highlight the presence of gamma ray photopeaks in the range of 13.9-1274 keV. Resolution of the 13.9 keV peak in the $^{241}$Am spectrum establishes the minimum detectable energy for this particular scintillator composition and light yield (6700 photons/MeV). As expected, the energy resolution values and relative photopeak sensitivities were both found to decrease at higher gamma-ray energies. These behaviors are summarized in Tables I and II, respectively. A significant observation evident from the data in Table II is that the 6% tin-loaded Example E was found to exhibit greater photopeak sensitivity across all tested energies than either Comparative Example 7 (EJ-256 (5% Pb)) or a 6.3% bismuth-loaded plastic. The data shown in FIG. 4 highlights this point by comparing the $^{137}$Cs pulse-height spectra for Example E and the 6.3% bismuth loaded scintillator. The absence of any noticeable photopeak for the bismuth-containing scintillator is noteworthy despite its greater density and average atomic number greater than that of tin in Example E.

Another key observation from the data in the plot of FIG. 4 relates to the shape of the respective pulse-height spectra. The 6.3% bismuth loaded scintillator exhibits a significantly greater weighting of counts in the lower energy region of the spectrum, which is inconsistent with expectations based on MCNP simulations. This finding is in contrast to the generally good agreement observed between experimental data and simulation for Example E. See FIG. 8 (discussed below), which shows a comparison of the measured and simulated pulse-height spectra for Example 120 (discussed below) using Na-22 (top) and Cs-137 (bottom) sources.

Figure 5:
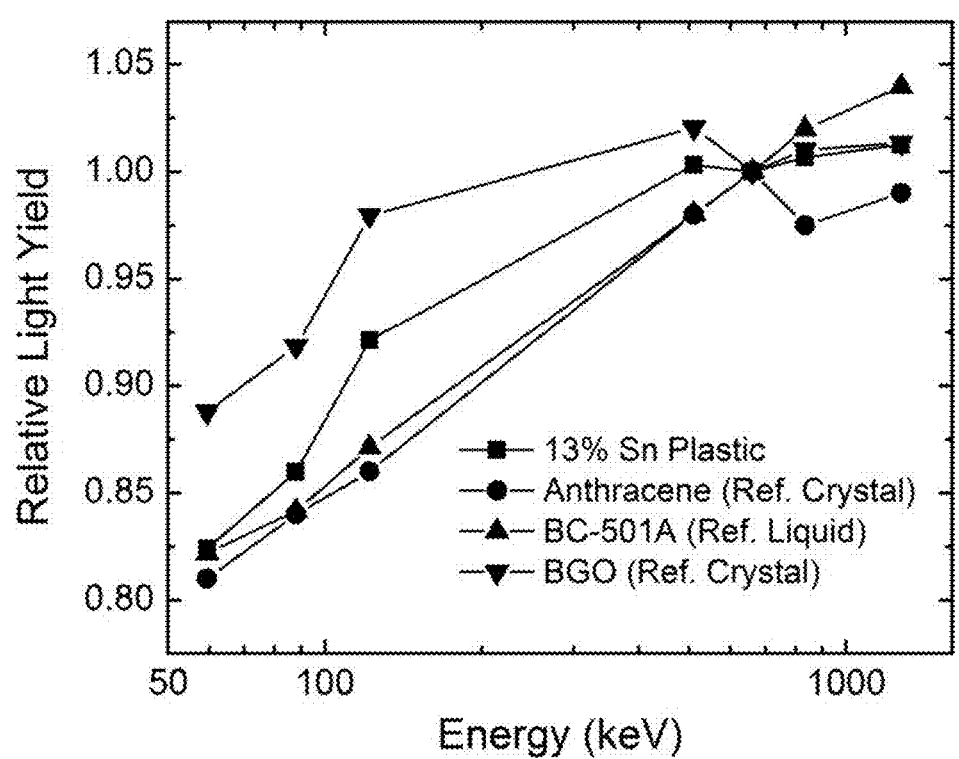
FIG. 5 is a plot of the photopeak position versus gamma-ray energy for Example E in the range of 59.5-1274 keV.
Figure 6A:
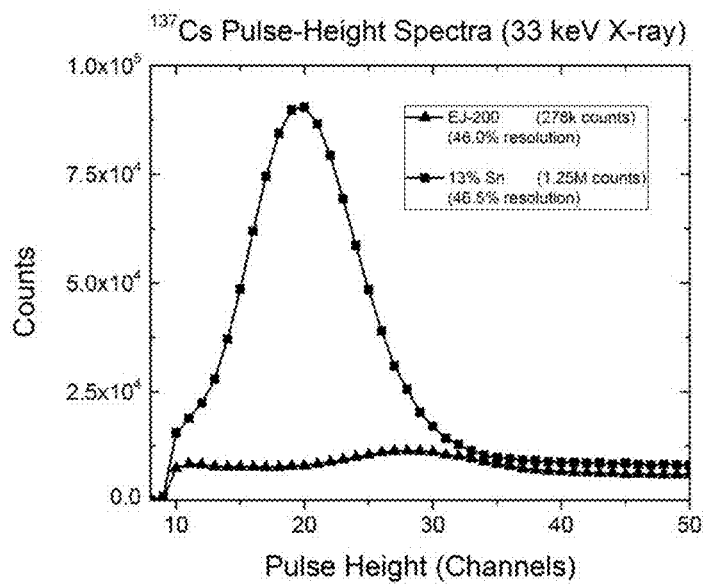
FIG. 6A-6G are several scintillation pulse height spectra of Example J (13% Sn) compared to a reference sample of EJ-200 plastic scintillator.
Figure 6B:
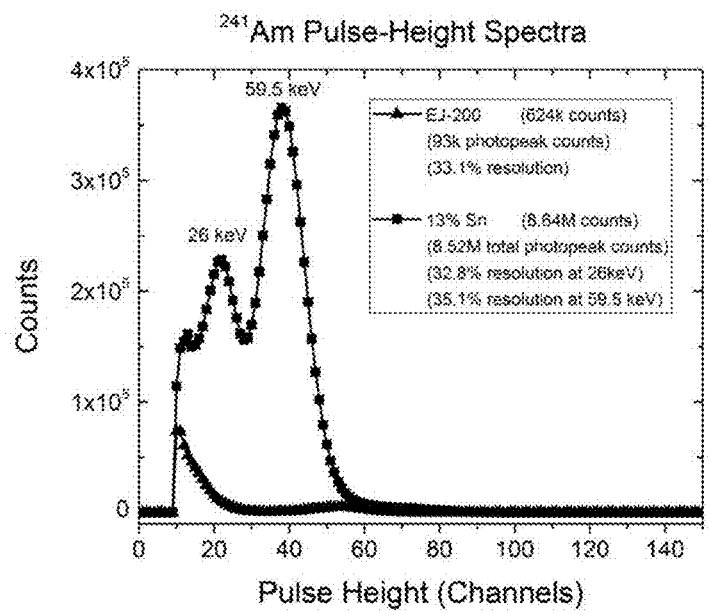
Figure 6C:
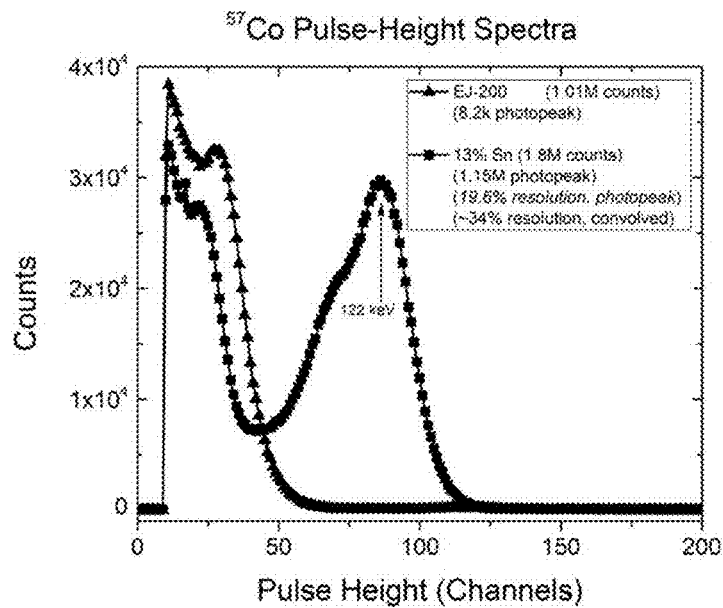
Figure 6D:
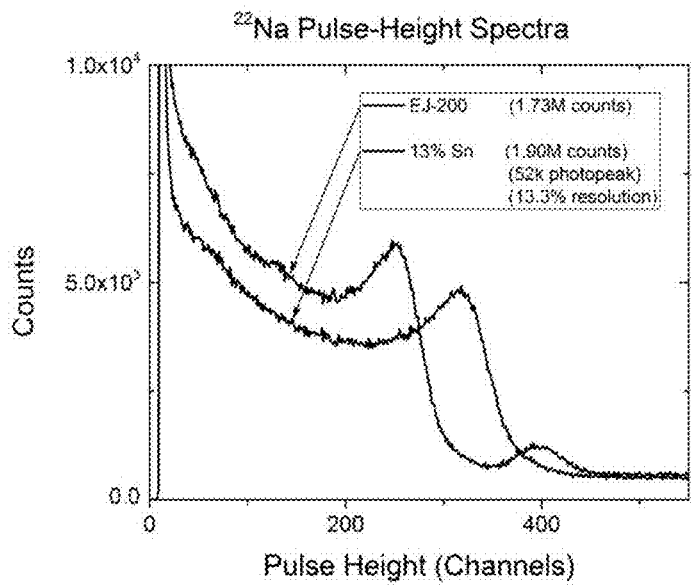
Figure 6E:
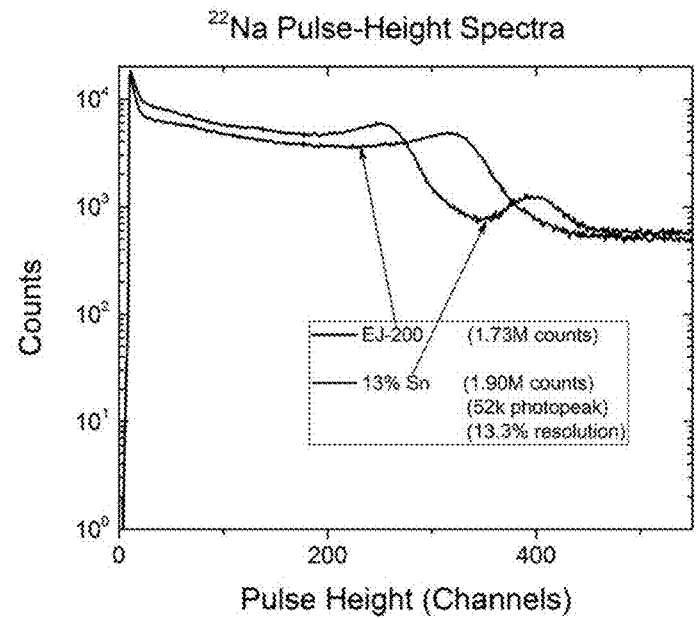
Figure 6F:
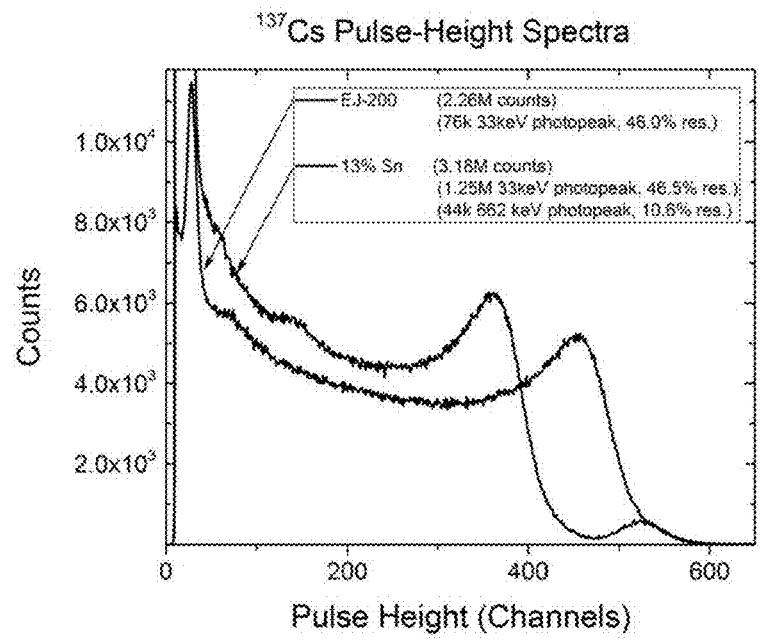
Figure 6G:
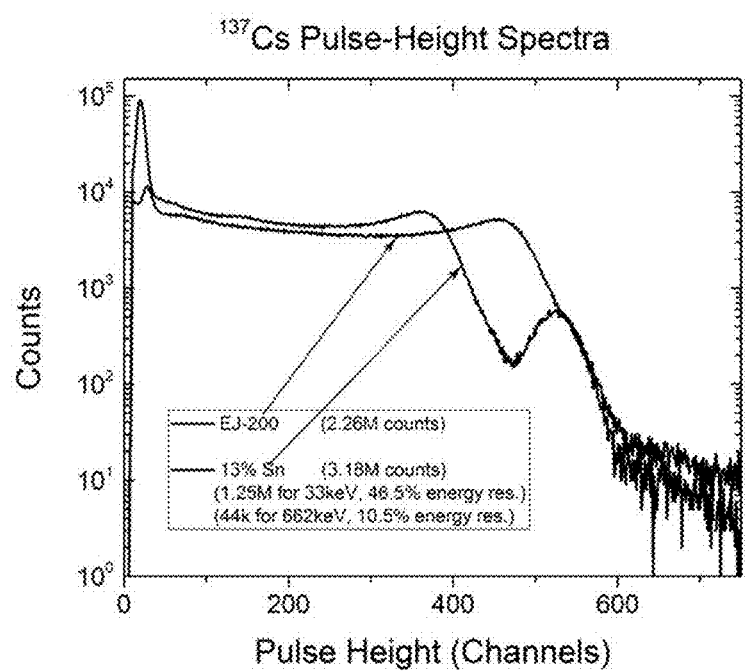

FIG. 5 is a plot of the relative scintillation light yield versus gamma-ray energy for Example E and several reference scintillator materials in the range of 59.5-1274 keV. These data provide the light-yield proportionality of each material, for which a horizontal line at 1.00 comprises ideal behavior. Proportional response is an important contributor to the energy resolution of a scintillator. The data reveal the most proportional light-yield response for the inorganic scintillator BGO and the least proportional response from the anthracene organic crystal and BC-501A liquid scintillator. The 13% tin-loaded plastic scintillator yielded an intermediate value.

Further Spectral Data on Example J

The seven figures FIG. 6A to 6G highlight several features of Example J which contained 13% tin. The data in these figures can be directly compared to the EJ-200 reference plastic scintillator since all experimental parameters (sample size, detector gain, count time, source activity/distance, etc.) were fixed.

Notably, the metal-loaded Example J showed a significant increase in the total number of detected events (integral of curves) compared to EJ-200, especially for gamma/X-rays below 511 keV. Also evident is the presence of a new spectral feature (photoelectric full-energy peak) in the 13% tin loaded data.

Additional Examples 119 to 124

Polymerization and Clarity

Figure 7:
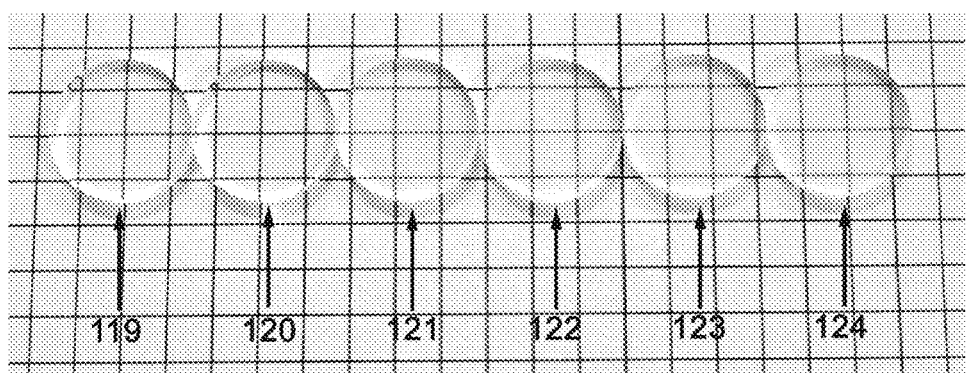
FIG. 7 is photograph showing several example plastic cylinders incorporating the tin material of Example E.

FIG. 7 shows a photograph of several 1" diameter×0.5" thick 6% tin-loaded scintillators (corresponding to the tin complex of Example E) that were prepared under different polymerization conditions. Example 120 is the most optically transparent, owing to the polymerization conditions.

Scintillation Timing Measurements

Figure 8:
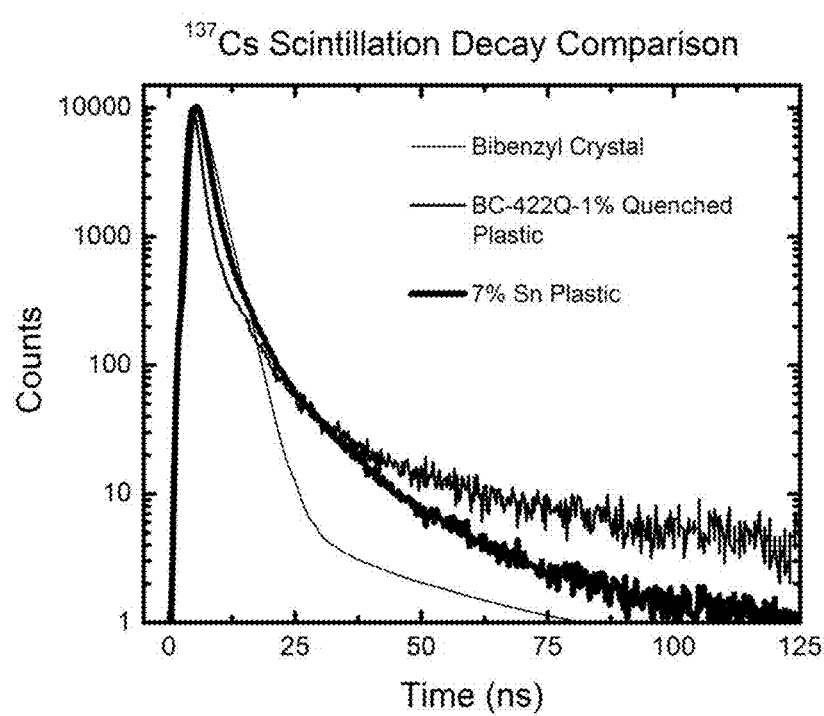
FIG. 8 is a plot showing $^{137}$Cs scintillation timing distributions obtained for example E and two reference scintillators used for high-rate detection. The 0.5% trans-stilbene doped bibenzyl data (black) were digitized from literature. The 1% benzophenone composition is analogous to BC-422Q-1%.

Scintillation timing measurements were collected to assess the decay kinetics for the synthesized tin-loaded plastic scintillator of Example E. Plastic scintillators generally possess much faster decay kinetics than inorganic scintillators, which is advantageous for high-rate applications. FIG. 8 (also mentioned above) provides the obtained $^{137}$Cs scintillation timing distributions obtained for Example E in comparison to two known organic scintillators used for high-rate and high timing resolution applications, 0.5% trans-stilbene doped bibenzyl crystal and 1% benzophenone doped plastic scintillator (BC-422Q). The 0.5% trans-stilbene doped bibenzyl data were digitized from literature.

Inspection of FIG. 8 reveals that the doped bibenzyl crystal decays the fastest, followed by Example E and the 1% benzophenone plastic. A consideration not conveyed by the data in this plot are the relative light yields of these materials. For example, the light yield for 1% benzophenone plastic (BC-422Q-1%) is approximately 1700 photons/MeV, which compares with 6700 photons/MeV for sample E. A reliable scintillation light yield could not be found in the literature for pure or 0.5% trans-stilbene doped bibenzyl, although pure bibenzyl is known to have a low fluorescence quantum yield that is comparable to that of toluene ($\varphi_f$=0.17). For comparison, Example E and BC-422Q-1% possess respective fluorescence quantum yields of 0.83 and 0.22 when excited at the excitation maxima of their PS/PVT matrices.

Figure 9:
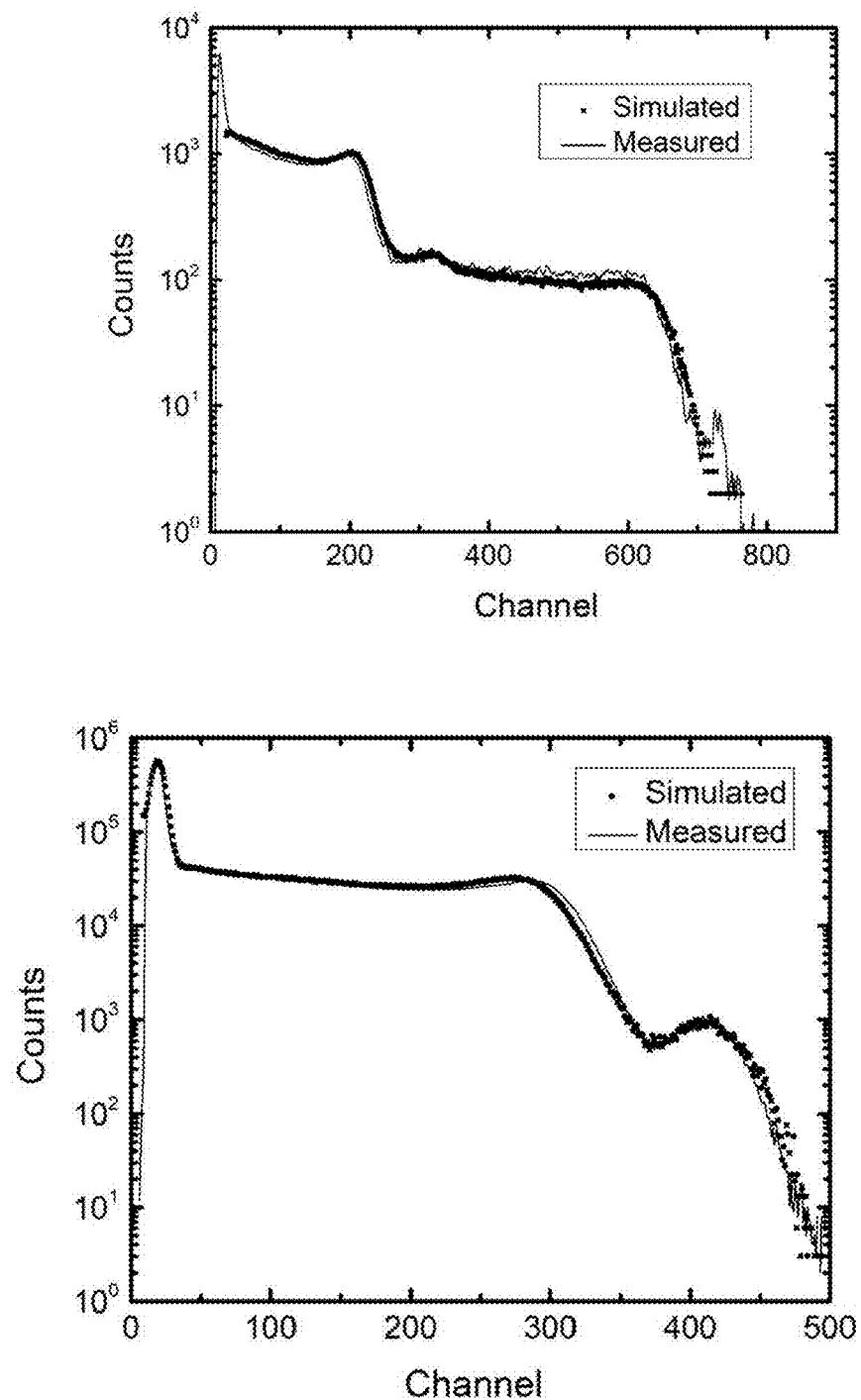
FIG. 9 are plots showing a comparison of the measured and simulated pulse-height spectra for Example 120 using Na-22 (top) and Cs-137 (bottom) sources.

FIG. 9 illustrates that the measured 11.4% energy resolution at 662 keV for Example E is higher than the approximately 7% theoretical limit based on Poisson statistics, suggesting there are additional mechanisms that broaden the spectroscopic response. A similar but slightly more pronounced effect is observed for Example C, in which the observed 10.9% energy resolution is worse than the corresponding approximate 6% theoretical limit. One factor that certainly broadens the energy resolution of Examples C and E involves the contribution of the tin escape X-rays, which are not compensated for in the energy resolution values for these compositions (Table I).

MCNP Simulations

MCNP5 simulations were performed to determine the gamma-ray response of Example 120 (made from most optically transparent plastic matrix with Example E) and to validate spectral features observed in measured pulse height spectrum. The MCNP5 input card had measurement setup components that included the sample constituent elements, the sample density, the PMT used in the measurement, and the surrounding environment. Gamma and X-ray energies from isotropic $^{22}$Na, $^{137}$Cs, and $^{241}$Am sources were sampled to simulate the respective radionuclide energy spectra detected in the simulated sample. Coupled photon-electron transport was made to assess energy deposited within the simulated sample. Energy deposited was smeared using measured energy resolution data to produce pulse height spectra for the respective radionuclides. FIG. 9 shows the simulated and the measured spectra performed on a composition corresponding to Example 120. Measured and simulated spectra were count and gain normalized for comparison. As it can be seen in FIG. 9, the spectra reasonably agree and have similar features. Negligible differences were observed that were related to counting statistics.

Figure 10:
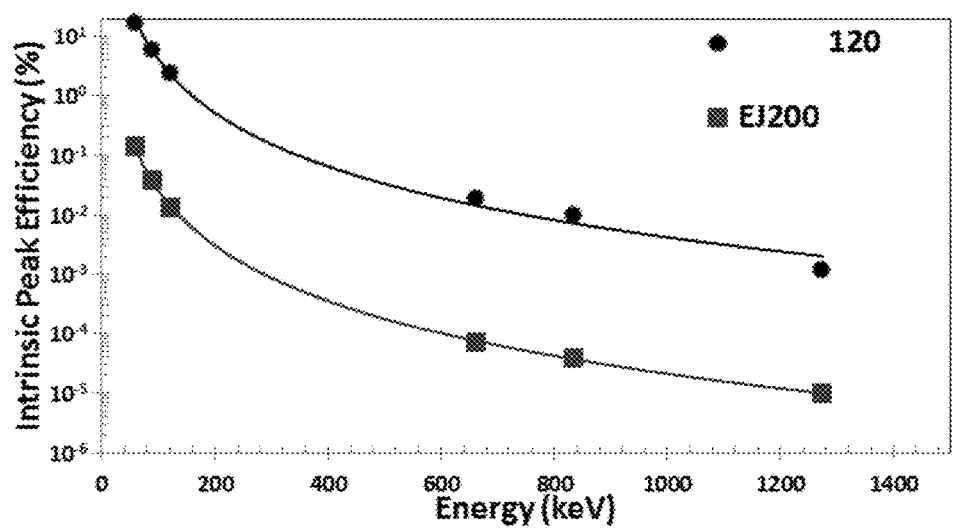
FIG. 10 shows a plot of simulated intrinsic peak efficiencies for Examples 120 and EJ-200 in the range of 59.5-1274 keV.

Simulated intrinsic peak efficiencies for Example 120 (6 wt. % Sn) using selected gamma-ray energies are shown in FIG. 10 in the range of 59.5-1274 keV. Full energy and Sn X-ray escape peaks were summed to evaluate 120 efficiencies. The lines serve as a guide for the eye. Also shown in FIG. 10 are EJ-200 simulated intrinsic peak efficiencies for respective energies. Peak efficiencies reported herein are dependent only on the volume and composition of the simulated Examples. Example 120 efficiency data included Sn X-ray escape peaks that are folded in the full energy peaks. It is apparent from the data that Example 120 (made from Example E) has an advantage over EJ-200 by a factor of greater than 200.

The above organotin compounds were selected based upon the cost of precursor materials and ease-of-synthesis. For example, the compound Bu$_3$Sn(MA) is readily prepared in high yield from the condensation reaction between bis (tributyltin) oxide and methacrylic acid. This condensation reaction involves simply mixing the two reagents in hexanes, followed by washing with water and removal of the remaining solvent under reduced pressure. The precursor materials for this synthesis are readily available in large quantities. This straightforward reaction and purification is expected to add minimal costs to the preparation of Bu$_3$Sn (MA). Thermal polymerization conditions directly analogous to those of traditional plastic scintillators indicate there will not be any additional costs associated with scale-up. In general, embodiments of the materials disclosed herein present substantial cost advantages to existing similar materials.

Examples X and Y

Example X was composed of polystyrene, 7% EGDMA cross-linker, 13% Sn (via Me$_4$Sn), 2% butyl-PBD primary fluorophore, and 0.05% AIBN initiator. It produced a light yield of 6000 photons/MeVee when polymerized at 40° C.

Example Y was composed of polystyrene, 7% EGDMA cross-linker, 13% Sn (via Me$_4$Sn), 2% butyl-PBD primary fluorophore, 0.05% AIBN initiator. It produced a light yield of 8400 photons/MeVee when polymerized at 65° C.

Figure 11:
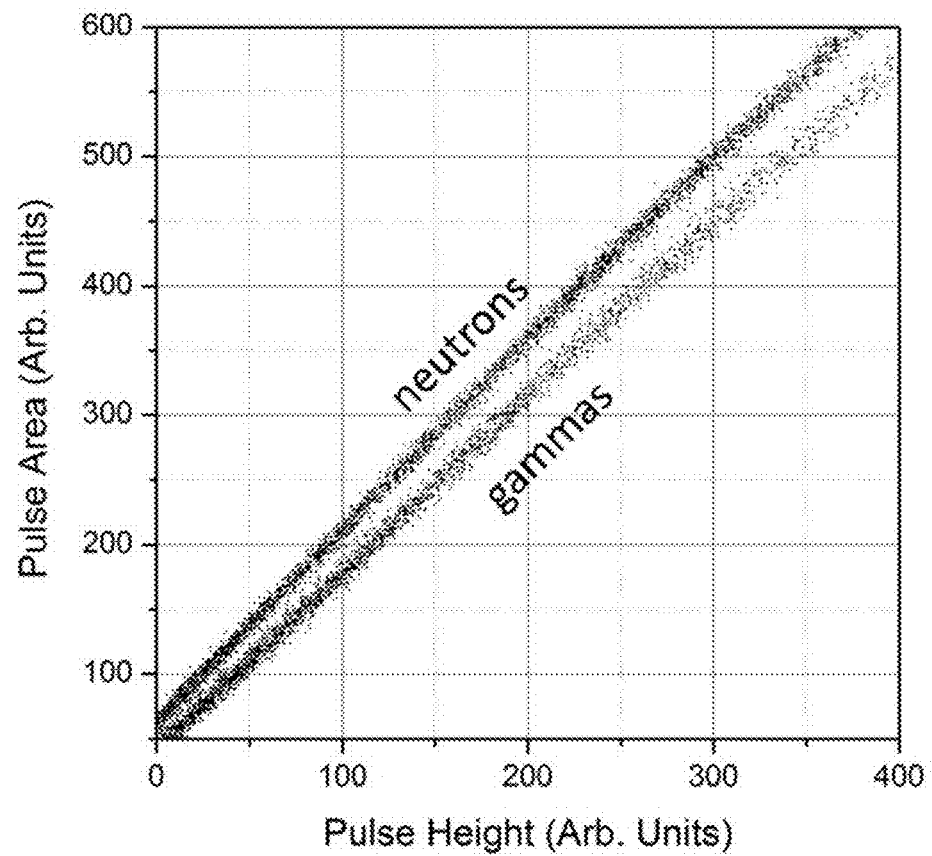
FIG. 11 is a data plot showing neutron/gamma discrimination via the pulse-shape discrimination (PSD) method.

FIG. 11 is a scatter plot demonstrating the ability of Example J to perform neutron/gamma discrimination using the method of pulse-shape discrimination (PSD). The experiment was conducted by exposing the detection material to a mixed radiation field of both fast neutrons and gamma-rays and then monitoring the shape of the light pulse generated within the scintillator (as detected by the photomultiplier tube). In this case, the pulse shape was evaluated by plotting the integral of the detected pulse (which corresponds to the amount of charge detected (i.e. nanoamperes) over a 1 microsecond time interval versus the amplitude of the pulse (voltage). Each point represents a single radiation event, so FIG. 11 shows the data obtained for a large number of individual radiation events.

The presence of two distinct distributions allows an operator to set a discrimination threshold to reject the gamma-rays, which differentiates this type of material from "non-PSD" scintillators such as EJ-200 commercial plastic scintillator. In comparison, a similar plot constructed for a non-PSD material such as EJ-200 would yield a single distribution.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. The articles "a," "an," and "the," should be interpreted to mean "one or more" unless the context indicates the contrary.

The invention claimed is:

1. A metal-loaded, liquid or plastic scintillator comprising:
   a matrix including a polymer or an aromatic liquid;
   an organometallic complex including a heavy metal with an atomic weight between 69 g/mol and 206 g/mol, the heavy metal complexed with an organic ligand having a number average molecular weight of at least 15 g/mol, optionally, the organic ligand is bonded to the polymer; and
   a primary and secondary fluorophore;
   wherein the organic ligand is exclusive of a carboxylate group.

2. The metal-loaded, liquid or plastic scintillator of claim 1, wherein the heavy metal is one or more of Tin, Antimony, Germanium, or Iridium.

3. The metal-loaded, liquid or plastic scintillator of claim 1, wherein the matrix is a plastic polymer comprising polymerized vinyl monomer units and has a weight average molecular (Mw) weight ranging from 40,000 to 1,000,000.

4. The metal-loaded, liquid or plastic scintillator of claim 1, wherein the matrix is an aromatic material with an aromaticity of 50% to 100% by weight of the total liquid.

5. The metal-loaded, liquid or plastic scintillator of claim 1, wherein the scintillator is capable of resolving gamma-ray photoelectric absorption peaks in the scintillation pulse-height spectra for energies between 32 keV to 1274 keV, and is capable of discriminating fast neutrons from gamma-rays according to the method of pulse-shape discrimination (PSD), while maintaining a scintillation light yield of at least 6,000 photons/MeVee.

6. The metal-loaded, liquid or plastic scintillator of claim 1, wherein the scintillator is capable of producing a scintillation light yield of at least 10,000 photons/MeVee light yield and at least 10% energy resolution at 662 keV.

7. The metal-loaded, liquid or plastic scintillator of claim 1, wherein the scintillator comprises 1.5% to 40% by weight of the heavy metal based on the total weight of the scintillator.

8. The metal-loaded, liquid or plastic scintillator of claim 1, further comprising a cross-linking additives in concentrations ranging from 0.5% to 15% by weight of the total composition.

9. A metal-loaded, liquid or plastic scintillator comprising:
  a matrix including a polymer or an aromatic liquid;
  an organometallic complex including a heavy metal with an atomic weight between 69 g/mol and 206 g/mol complexed with an organic ligand; optionally, the organic ligand is bonded to the polymer, the heavy metal and the organic ligand selected to provide the scintillator with the capability of resolving gamma-ray photoelectric absorption peaks in the scintillation pulse-height spectra for energies between 32 keV to 1274 keV, and being capable of discriminating fast neutrons from gamma-rays according to the method of pulse-shape discrimination (PSD) while maintaining a scintillation light yield of at least 6,000 photons/MeVee; and
  a primary and secondary fluorophore;
  wherein the organic ligand is exclusive of a carboxylate group.

10. The metal-loaded, liquid or plastic scintillator of claim 9, wherein the heavy metal is one or more of tin, antimony, germanium, or indium.

11. The metal-loaded, liquid or plastic scintillator of claim 9, wherein the organic ligand includes an aromatic group.

12. The metal-loaded liquid or plastic scintillator of claim 9, wherein the organometallic complex has the formula $(R_1)_x(R_2)_{4-x}M$, where M is tin, antimony, germanium, or indium, and $R_1$ and $R_2$ are independently selected from the group consisting of methyl, ethyl, propyl, butyl, isopropyl, tert-butyl, alcohol, phenyl, benzyl, phenylethyl, phenylpropyl, naphthyl, methylnaphthyl, styrl, or methylstyrl, and $R_2$ may also be selected from a polymerizable group such as styrl, methylstyrl, acrylate, methacrylate, vinyl methacrylate, or furfuryl methacrylate; and x is an integer between 0 and 4.

13. The metal-loaded liquid or plastic scintillator of claim 9, wherein the scintillator is a plastic scintillator, the plastic scintillator has a light transmittance of 85% to 100% as determined by ASTM D1003-13, and the heavy metal is present in an amount of 1.5 to 40% by weight of the total scintillator.

14. A method of making a metal-loaded liquid or plastic scintillator, the method comprising the steps of:
  dissolving an organometallic complex in an aromatic liquid or a monomer;
  dissolving a primary fluorophore in the aromatic liquid or monomer;
  dissolving a secondary fluorophore in the aromatic liquid or monomer;
  if the monomer is present, initiating polymerization of the monomer; and
  controlling heating and cooling rates to avoid cracking of the polymerized material;
  wherein the organometallic complex includes a heavy metal with an atomic weight between 69 g/mol and 206 g/mol, the heavy metal complexed with an organic ligand having a number average molecular weight of at least 15 g/mol, optionally, the organic ligand being bonded to a polymer formed from the monomer;
  wherein the organic ligand is exclusive of a carboxylate group.

15. The method of claim 14, further comprising adding a radical initiator.

16. The method of claim 14, further comprising adding a cross-linking agent and controlling the heating to a maximum temperature that is less than the boiling point of the organometallic complex.

17. The method of claim 16, wherein the cross-linking agent is ethyleneglycol dimethacrylate (EGDMA) and/or 1,4-divinylbenzene in concentrations of 0.5% to 15% by weight of the total solution.

18. The method of claim 14, wherein the scintillator is capable of resolving gamma-ray photoelectric absorption peaks in the scintillation pulse-height spectra for energies between 32 keV to 1274 keV, while maintaining a scintillation light yield of at least 6,000 photons/MeVee.

19. The method of claim 14, wherein the scintillator is capable of producing a scintillation light yield of at least 10,000 photons/MeVee light yield and at least 10% energy resolution at 662 keV.

20. The metal-loaded, liquid or plastic scintillator of claim 1, wherein the metal loaded, liquid or plastic scintillator is mechanically rigid at room temperature with a Shore D hardness of 15 or greater according to ASTM D2240 00.

* * * * *

UNITED STATES PATENT AND TRADEMARK OFFICE
CERTIFICATE OF CORRECTION

PATENT NO. : 10,024,983 B1
APPLICATION NO. : 15/287555
DATED : July 17, 2018
INVENTOR(S) : Patrick L. Feng et al.

Page 1 of 1

It is certified that error appears in the above-identified patent and that said Letters Patent is hereby corrected as shown below:

On the Title Page

Item (72) Inventors: Please delete "Nicolas" and insert therefore --Nicholas--.

Signed and Sealed this
Eighth Day of October, 2019

Andrei Iancu
*Director of the United States Patent and Trademark Office*